United States Patent
Pidaparthi et al.

(10) Patent No.: US 12,485,544 B2
(45) Date of Patent: Dec. 2, 2025

(54) WORKFLOW FOR USING LEARNING BASED APPROACH FOR PLACING BOXES ON PALLETS

(71) Applicant: Dexterity, Inc., Redwood City, CA (US)

(72) Inventors: Rohit Arka Pidaparthi, Mountain View, CA (US); William Arthur Clary, Palo Alto, CA (US); Neeraja Abhyankar, Menlo Park, CA (US); Jonathan Kuck, Palo Alto, CA (US); Ben Varkey Benjamin Pottayil, Foster City, CA (US); Kevin Jose Chavez, Redwood City, CA (US); Shitij Kumar, Redwood City, CA (US)

(73) Assignee: Dexterity, Inc., Redwood City, CA (US)

( * ) Notice: Subject to any disclaimer, the term of this patent is extended or adjusted under 35 U.S.C. 154(b) by 782 days.

(21) Appl. No.: 17/838,045

(22) Filed: Jun. 10, 2022

(65) Prior Publication Data
US 2022/0402139 A1 Dec. 22, 2022

Related U.S. Application Data

(60) Provisional application No. 63/211,368, filed on Jun. 16, 2021.

(51) Int. Cl.
*B25J 9/16* (2006.01)

(52) U.S. Cl.
CPC ............. *B25J 9/1687* (2013.01); *B25J 9/163* (2013.01); *G05B 2219/39001* (2013.01); *G05B 2219/42152* (2013.01)

(58) Field of Classification Search
CPC ............. B25J 9/1687; B25J 9/163; G05B 2219/39001; G05B 2219/42152
See application file for complete search history.

(56) References Cited

U.S. PATENT DOCUMENTS

| 4,641,271 A | 2/1987 | Konishi |
| 4,692,876 A | 9/1987 | Tenma |

(Continued)

FOREIGN PATENT DOCUMENTS

| CN | 107000208 | 8/2017 |
| CN | 109421071 | 3/2019 |

(Continued)

OTHER PUBLICATIONS

Balakirsky et al. 'Using Simulation to Assess the Effectiveness of Pallet Stacking Methods', Nov. 31, 2010 (Nov. 31, 2010), [online], retrieved from <URL: https://www.researchgate.net/publication/220850165_Using_Simulation_to_Assess_the_Effectiveness_of_Pallet_Stacking_Methods>, entire document.

(Continued)

*Primary Examiner* — Kyle O Logan
(74) *Attorney, Agent, or Firm* — Van Pelt, Yi & James LLP

(57) ABSTRACT

A robotic system is disclosed. The system includes a memory that stores a machine learning-based model to provide a scoring function value for a candidate item placement on a pallet on which are plurality of items are to be stacked given a current state value of the pallet and a set of zero or more items placed previously. The system includes one or more processors that use the model to determine a corresponding score for each of a plurality of candidate placements for a next item to be placed and the current state value associated with the current state of the pallet and a set of zero or more items placed previously, select a selected placement based at least in part on the respective scores, control a robotic arm to place the next item according to the selected placement.

20 Claims, 13 Drawing Sheets

(56) References Cited

U.S. PATENT DOCUMENTS

| | | | |
|---|---|---|---|
| 5,175,692 A * | 12/1992 | Mazouz | B65G 61/00 901/7 |
| 5,501,571 A * | 3/1996 | Van Durrett | B65G 61/00 414/21 |
| 5,908,283 A * | 6/1999 | Huang | G06Q 10/043 414/21 |
| 5,920,480 A | 7/1999 | Nakamura | |
| 6,055,462 A | 4/2000 | Sato | |
| 7,266,422 B1 | 9/2007 | DeMotte | |
| 7,644,052 B1 | 1/2010 | Chang | |
| 8,290,617 B2 | 10/2012 | Ruge | |
| 8,504,413 B1 | 8/2013 | Rowe | |
| 9,079,305 B2 | 7/2015 | Williamson | |
| 9,102,055 B1 | 8/2015 | Konolige | |
| 9,227,323 B1 | 1/2016 | Konolige | |
| 9,315,344 B1 | 4/2016 | Lehmann | |
| 9,387,589 B2 | 7/2016 | Barajas | |
| 9,600,798 B2 | 3/2017 | Battles | |
| 9,866,815 B2 | 1/2018 | Vrcelj | |
| 9,926,138 B1 | 3/2018 | Brazeau | |
| 10,169,677 B1 | 1/2019 | Ren | |
| 10,252,870 B2 | 4/2019 | Kimoto | |
| 10,335,947 B1 | 7/2019 | Diankov | |
| 10,456,915 B1 | 10/2019 | Diankov | |
| 10,549,928 B1 | 2/2020 | Chavez | |
| 10,576,630 B1 | 3/2020 | Diankov | |
| 10,618,172 B1 | 4/2020 | Diankov | |
| 10,647,528 B1 | 5/2020 | Diankov | |
| 10,679,379 B1 | 6/2020 | Diankov | |
| 10,696,493 B1 | 6/2020 | Diankov | |
| 10,696,494 B1 | 6/2020 | Diankov | |
| 10,722,992 B2 | 7/2020 | Wada | |
| 10,786,899 B2 | 9/2020 | Kimoto | |
| 10,953,549 B2 | 3/2021 | Diankov | |
| 10,984,378 B1 * | 4/2021 | Eckman | G06K 19/06131 |
| 11,020,854 B2 | 6/2021 | Kanunikov | |
| 11,077,554 B2 | 8/2021 | Arase | |
| 11,305,431 B2 | 4/2022 | Ghazaei Ardakani | |
| 11,319,166 B2 | 5/2022 | Diankov | |
| 11,472,640 B2 | 10/2022 | Diankov | |
| 11,488,323 B2 | 11/2022 | Diankov | |
| 11,591,168 B2 | 2/2023 | Diankov | |
| 11,591,169 B2 | 2/2023 | Chavez | |
| 11,794,346 B2 | 10/2023 | Diankov | |
| 11,905,115 B2 | 2/2024 | Sun | |
| 11,932,501 B2 | 3/2024 | Hau | |
| 12,157,231 B2 | 12/2024 | Kanunikov | |
| 12,162,704 B2 | 12/2024 | Mccalib, Jr. | |
| 2004/0165980 A1 | 8/2004 | Huang | |
| 2005/0246056 A1 | 11/2005 | Marks | |
| 2008/0131255 A1 | 6/2008 | Hessler | |
| 2009/0069939 A1 | 3/2009 | Nagatsuka | |
| 2010/0178149 A1 | 7/2010 | Fritzsche | |
| 2010/0222915 A1 | 9/2010 | Kuehnemann | |
| 2010/0249989 A1 | 9/2010 | Baldes | |
| 2011/0122231 A1 | 5/2011 | Fujieda | |
| 2011/0231016 A1 | 9/2011 | Goulding | |
| 2013/0231778 A1 | 9/2013 | Østergaard | |
| 2013/0233116 A1 | 9/2013 | Rose | |
| 2013/0282165 A1 | 10/2013 | Pankratov | |
| 2014/0012415 A1 | 1/2014 | Benaim | |
| 2014/0343910 A1 | 11/2014 | Zheng | |
| 2015/0073588 A1 | 3/2015 | Priebe | |
| 2016/0016311 A1 * | 1/2016 | Konolige | B25J 9/1664 901/30 |
| 2016/0221187 A1 | 8/2016 | Bradski | |
| 2016/0272354 A1 | 9/2016 | Nammoto | |
| 2016/0355337 A1 | 12/2016 | Lert | |
| 2017/0043953 A1 | 2/2017 | Battles | |
| 2017/0246744 A1 | 8/2017 | Chitta | |
| 2017/0267467 A1 * | 9/2017 | Kimoto | G05B 19/41865 |
| 2018/0060765 A1 | 3/2018 | Hance | |
| 2018/0065818 A1 | 3/2018 | Gondoh | |
| 2018/0086572 A1 * | 3/2018 | Kimoto | G05B 19/4182 |
| 2018/0162660 A1 | 6/2018 | Saylor | |
| 2018/0304468 A1 | 10/2018 | Holz | |
| 2019/0016543 A1 * | 1/2019 | Turpin | B65G 59/02 |
| 2019/0061151 A1 | 2/2019 | Namiki | |
| 2019/0091728 A1 | 3/2019 | Stratton | |
| 2019/0143504 A1 | 5/2019 | Kimoto | |
| 2019/0193956 A1 | 6/2019 | Morland | |
| 2019/0213291 A1 | 7/2019 | Higuchi | |
| 2020/0094997 A1 * | 3/2020 | Menon | B65B 43/54 |
| 2020/0171653 A1 * | 6/2020 | Holson | B25J 9/163 |
| 2020/0270071 A1 | 8/2020 | Chavez | |
| 2020/0376662 A1 | 12/2020 | Arase | |
| 2020/0376670 A1 | 12/2020 | Diankov | |
| 2020/0377311 A1 | 12/2020 | Diankov | |
| 2020/0377312 A1 * | 12/2020 | Diankov | B65B 57/00 |
| 2020/0377315 A1 | 12/2020 | Diankov | |
| 2020/0380722 A1 | 12/2020 | Diankov | |
| 2020/0398441 A1 | 12/2020 | Marchese | |
| 2021/0023719 A1 | 1/2021 | Alt | |
| 2021/0053216 A1 | 2/2021 | Diankov | |
| 2021/0129333 A1 * | 5/2021 | Kanunikov | B25J 9/1666 |
| 2021/0129334 A1 * | 5/2021 | Kanunikov | B65G 61/00 |
| 2021/0139256 A1 * | 5/2021 | Fu | B65G 61/00 |
| 2021/0170596 A1 | 6/2021 | Diankov | |
| 2021/0201221 A1 * | 7/2021 | Abraham | G06T 7/55 |
| 2021/0214163 A1 | 7/2021 | Deacon | |
| 2021/0237274 A1 | 8/2021 | Diankov | |
| 2022/0219916 A1 | 7/2022 | Diankov | |
| 2022/0288787 A1 | 9/2022 | Dupree | |
| 2022/0297958 A1 | 9/2022 | Moreno | |
| 2022/0402708 A1 | 12/2022 | Pidaparthi | |
| 2022/0402709 A1 | 12/2022 | Pidaparthi | |
| 2022/0402710 A1 | 12/2022 | Pidaparthi | |
| 2022/0405439 A1 | 12/2022 | Pidaparthi | |
| 2023/0016733 A1 | 1/2023 | Diankov | |
| 2023/0278811 A1 | 9/2023 | Diankov | |

FOREIGN PATENT DOCUMENTS

| | | |
|---|---|---|
| CN | 110769985 | 2/2020 |
| CN | 112507820 | 3/2021 |
| CN | 112589791 | 4/2021 |
| CN | 112775960 | 5/2021 |
| DE | 102010022357 | 7/2014 |
| DE | 102020114577 | 5/2022 |
| JP | 6771799 | 10/2020 |
| JP | 2020196624 | 12/2020 |
| JP | 7362755 | 10/2023 |
| TW | 201914782 | 4/2019 |
| TW | 202040502 | 11/2020 |
| TW | 202113706 | 4/2021 |

OTHER PUBLICATIONS

Braunl et al. "Fault-Tolerant Robot Programming through Simulation with Realistic Sensor Models." In: Sage Journals, Jun. 1, 2006, [online] [retrieved on Sep. 27, 2022 (Sep. 27, 2022)] Retrieved from the Internet< URL: https://journals.sagepub.com/doi/10.5772/5750>, entire document.

Verma et al. "A Generalized Reinforcement Learning Algorithm for Online 3D Bin-Packing." In: Cornell University Library/Computer Science / Artificial Intelligence, Jul. 1, 2020, [online] [retrieved on Sep. 28, 2022 (Sep. 28, 2022)] Retrieved from the Internet < URL: https://arxiv.org/abs/2007.00463 >, entire document.

Verma et al. A Generalized Reinforcement Learning Algorithm for Online 3D Bin-Packing . Jul. 1, 2020.

Schuster et al: "Stable Stacking for the Distributor's Pallet Packing Problem", Intelligent Robots And Systems (IROS), 2010 IEEE/RSJ International Conference On, IEEE, Piscataway, NJ, USA, Oct. 18, 2010 (Oct. 18, 2010), pp. 3646-3651, XP031888390, DOI: 10.1109/IROS.2010.5650217 ISBN: 978-1-4244-6674-0.

* cited by examiner

200

WORKFLOW FOR USING LEARNING BASED APPROACH FOR PLACING BOXES ON PALLETS

CROSS REFERENCE TO OTHER APPLICATIONS

This application claims priority to U.S. Provisional Patent Application No. 63/211,368 entitled WORKFLOW FOR USING LEARNING BASED APPROACH FOR PLACING BOXES ON PALLETS WITH LIMITED KNOWLEDGE OF FUTURE SEQUENCE filed Jun. 16, 2021 which is incorporated herein by reference for all purposes.

BACKGROUND OF THE INVENTION

Shipping and distribution centers, warehouses, shipping docks, air freight terminals, big box stores, and other activities that ship and receive non-homogeneous sets of items use strategies such as packing and unpacking dissimilar items in boxes, crates, containers, conveyor belts, and on pallets, etc. Packing dissimilar items in boxes, crates, on pallets, etc. enables the resulting sets of items to be handled by heavy lifting equipment, such as forklifts, cranes, etc., and enables items to be packed more efficiently for storage (e.g., in a warehouse) and/or shipment (e.g., in truck, cargo hold, etc.).

In some contexts, items may be so dissimilar in size, weight, density, bulkiness, rigidity, strength of packaging, etc. that any given item or set of items may or may not have attributes that would enable those items to support the size, weight, distribution of weight, etc., of a given other item that might be required to be packed (e.g., in a box, container, pallet, etc.). When assembling a pallet or other set of dissimilar items, items must be selected and stacked carefully to ensure the palletized stack does not collapse, lean, or otherwise become unstable (e.g., so as not to be able to be handled by equipment such as a forklift, etc.) and to avoid item damage.

Currently, pallets typically are stacked and/or unpacked by hand. Human workers select items to be stacked, e.g., based on a shipping invoice or manifest, etc., and use human judgment and intuition to select larger and heavier items to place on the bottom, for example. However, in some cases, items simply arrive via a conveyor or other mechanism and/or are selected from bins in an order listed, etc., resulting in an unstable palletized or otherwise packed set.

Use of robotics is made more challenging in many environments due to the variety of items, variations in the order, number, and mix of items to be packed, on a given pallet for example, and a variety of types and location of container and/or feed mechanism from which items must be picked up to be placed on the pallet or other container.

BRIEF DESCRIPTION OF THE DRAWINGS

Various embodiments of the invention are disclosed in the following detailed description and the accompanying drawings.

DETAILED DESCRIPTION

Figure 1:
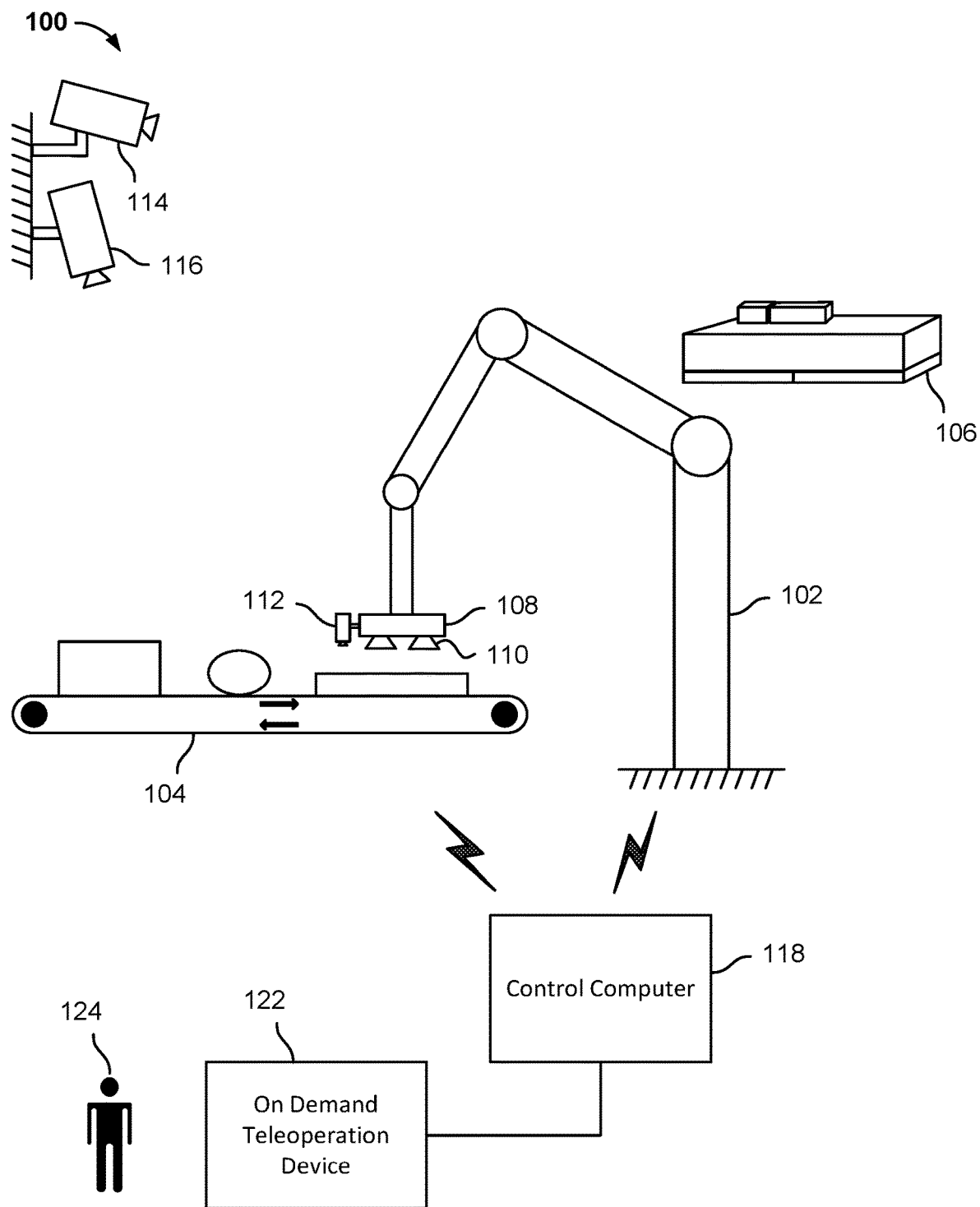
FIG. 1 is a diagram illustrating a robotic system to palletize and/or depalletize heterogeneous items according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a geometric model may mean a model of a state of a workspace such as a programmatically determined state. For example, the geometric model is generated using geometric data determined in connection with generating a plan to move an item in the workspace and an expected result if the item was moved according to plan. For example, a geometric model corresponds to a state of a workspace that is modified by controlling a robotic arm to pick, move, and/or place items within the workspace, and the picking, moving, and placing of the item is deemed to be performed according to plan (e.g., without error such as error or noise that may be introduced based on (i) a mis-configuration or mis-alignment of the robotic arm or another component in the workspace, (ii) a deforming of the item based on interaction with the robotic arm, (iii) another item in the workspace, another object in the workspace, (iv) a collision between the robotic arm, or item being moved by the robotic arm, and another object in the workspace, etc.).

As used herein, "pallet" includes a platform, receptacle, or other container on, or in, which one or more items may be stacked or placed. Further, as used herein, the pallet may be used in connection with packaging and distributing a set of one or more items. As an example, the term pallet includes the typical flat transport structure that supports items and that is movable via a forklift, a pallet jack, a crane, etc. A pallet, as used herein, may be constructed of various materials including, wood, metals, metal alloys, polymers, etc.

As used herein, palletization of an item or a set of items includes picking an item from a source location, such as a conveyance structure, and placing the item on a pallet such as on a stack of items on the pallet.

As used herein, depalletization includes picking an item from a pallet, such as from a stack of items on the pallet, moving the item, and placing the item at a destination location such as a conveyance structure. An example palletization/depalletization system and/or process for palletizing/de-palletizing a set of items is further described in U.S. patent application Ser. No. 17/343,609, the entirety of which is hereby incorporated herein for all purposes.

As used herein, singulation of an item includes picking an item from a source pile/flow and placing the item on a conveyance structure (e.g., a segmented conveyor or similar conveyance). Optionally, singulation may include sortation of the various items on the conveyance structure such as via singly placing the items from the source pile/flow into a slot or tray on the conveyor. An example of a singulation system and/or process for singulating a set of items is further described in U.S. patent application Ser. No. 17/246,356, the entirety of which is hereby incorporated herein for all purposes.

As used herein, kitting includes the picking of one or more items/objects from corresponding locations and placing the one or more items in a predetermined location in a manner that a set of the one or more items corresponds to a kit. An example of a kitting system and/or process for kitting a set of items is further described in U.S. patent application Ser. No. 17/219,503, the entirety of which is hereby incorporated herein for all purposes.

As used herein, a vision system includes one or more sensors that obtain sensor data, for example, sensor data pertaining to a workspace. Sensors may include one or more of a camera, a high-definition camera, a 2D camera, a 3D (e.g., RGBD) camera, an infrared (IR) sensor, other sensors to generate a three-dimensional view of a workspace (or part of a workspace such as a pallet and stack of items on the pallet), any combination of the foregoing, and/or a sensor array comprising a plurality of sensors of the foregoing, etc. An example of a vision system is further described in U.S. patent application Ser. No. 16/667,661, the entirety of which is hereby incorporated herein for all purposes.

Various embodiments include a system, method, and/or device for picking and placing items. The system includes a memory and one or more processors coupled to the memory. The memory is configured to store a machine learning-based model to provide a scoring function value for a candidate item placement on a pallet on which are plurality of items are to be stacked given a current state value of the pallet and a set of zero or more items placed previously. The one or more processors are configured to (i) use the model to determine a corresponding score for each of a plurality of candidate placements for a next item to be placed and the current state value associated with the current state of the pallet and a set of zero or more items placed previously, (ii) select a selected placement based at least in part on the respective scores, and (iii) control a robotic arm to place the next item according to the selected placement.

Various embodiments include a system, method, and/or device for picking and placing items. The system includes a communication interface and one or more processors coupled to the communication interface. The communication interface is configured to receive, from one or more sensors deployed in a workspace, sensor data indicative of a current state of the workspace, the workspace comprising a pallet or other receptacle and a set of zero or more items stacked on or in the receptacle. The one or more processors are coupled to the communication interface and configured to (i) use the sensor data to estimate a state of one or both of the pallet or other receptacle and zero or more items stacked on or in the receptacle, and (ii) use the estimated state to generate or update a plan to control a robotic arm to place a next set of items on or in, or remove the next set of items from, the pallet or other receptacle, the plan comprising an ordered sequence of item placements or removals. The plan is generated or updated at least in part by performing a bounded tree search in which a subset of possible ordered sequences is explored. The subset is determined by one or both of selecting for exploration tree branches that satisfy one or more selection criteria or omitting from consideration one or more branches that satisfy a pruning criteria.

The determining of where to place an item based on the sensor data may require a model of the state of a pallet or receptacle (e.g., an estimated state) on which an item is placed and/or a model of a stack of items on the pallet or receptacle. In some implementations, the system determines where to place a current item without regard to a next or future item. The determining to place an item without consideration of a next item or next set of items may lead to an imperfect palletization of the set of items (e.g., sub-optimal density of items, sub-optimal time/efficiency with which entire set of items is palletized, etc.).

Various embodiments determine a placement (e.g., a destination location and orientation) according to which a current item is to be placed with regard to a next or future item (or a predefined number of next items). The system determines the placement of the current item (e.g., a scenario according to which the item is to be placed) based on (i) an estimated state of the pallet or stack of items, and (ii) determined combinations/permutations of placements of the current item and the next item (or predefined number of next items). In some embodiments, the system uses a scoring function (e.g., a function that scores a placement, and that may be an inverse of, or negatively related to, a corresponding cost function) in connection with determining a best placement of the current item (e.g., the first next item).

Some challenges arising from the use of knowledge of a future sequence of items to be palletized include:
  Each item may be placed in one of several locations and/or several orientations on the pallet/stack of items.
  To determine a plan to place the item at a particular location and/or in a particular orientation based at least in part on some optimization (e.g., packing density, time to move the item, etc.) may include determining/simulating outcomes of different possible scenarios. The determining/simulating the different outcomes may be computationally burdensome/inefficient.

If one or more future items are considered when determining, from among a plurality of locations, a location at which a current and/or a future item(s) is to be placed, the computational burden to determine/simulate outcomes of different possible scenarios for placing each item at each possible location becomes exponentially cumbersome. As an example, suppose the system knows the sequence of the next 5 boxes (e.g., items) and suppose the system can place the 1st box in 4 placements (e.g., 4 different combinations of locations and orientations). The system may simulate all 4 placements, and then the system expands the search for the next box with 4 more placements. After a 2-depth search, the system reaches 16 possible scenarios. This number of scenarios grows exponentially and is not tractable with a higher depth of search.

Various embodiments include a system that uses a tree-search in connection with determining a placement (e.g., a destination location and orientation) according to which one or more items (e.g., a current item and/or one or more future items in a sequence of items) are to be placed. The system may explore a tree corresponding to different scenarios in connection with determining the location at which to place the one or more items (e.g., to find a best or optimal arrangement of the one or more items, or the pallet, etc.). The different scenarios may respectively correspond to an arrangement of one or more items at corresponding locations on the pallet/stack of items. In some embodiments, the system explores the tree to a certain depth. The depth to which the system explores the tree may be predefined or may be based at least in part on a threshold such as a threshold pertaining to a computational load to explore a particular branch/scenario.

According to various embodiments, the system determines a search space corresponding to states according to various placements of a set of items. Evaluation of the entire search space can be computationally expensive and add undesirable latency to determining a plan to pick and place an item. In order to reduce the computational complexity (and requisite resources/time) of assessing the various scenarios (e.g., combinations/permutations of placements) for a set of items, the system implements a pruning process/technique to reduce the number of combinations/permutations to be considered. The system can prune the search space to remove placements that are non-ideal (e.g., are not sufficiently stable, do not have sufficient packing density, is resource intensive, etc.). The system may prune the search space based at least in part on a scoring function or a cost function. For example, the system computes, for the scenarios (e.g., nodes) in the search space, a score according to a predefined scoring function, and the system determines whether the score for a particular scenario is less than a predefined scoring threshold. If the score is less than the predefined scoring threshold, the system determines to prune the particular scenario (e.g., the node) from the search space. As another example, the system computes, for the scenarios in the search space, a cost according to a predefined cost function, and the system determines whether the corresponding cost is greater than a predefined cost threshold. In response to determining that the cost for a particular scenario is greater than the predefined cost threshold, the system determines to prune the particular scenario from the search space. In some embodiments, the system prune scenarios that are downstream of the particular scenario (e.g., downstream nodes that branch directly or indirectly from the node for the particular scenarios). The downstream nodes can be pruned without the system having computed a score or cost for the corresponding scenarios (e.g., computational resources are saved by pruning downstream nodes from the search space). After pruning the search space, the system can assess the remaining scenarios (e.g., combinations/permutations of placements) to determine a placement that yields a best result (e.g., a best placement determined based on one or more of an expected stability, a cost function, a scoring function, etc.). The system uses the placement that yields a best result to determine a plan for picking and placing an item (e.g., a next item in the set of items).

In some embodiments, the system implements a machine learning model in connection with pruning the search space. For example, the system bounds the search space based on using a machine-learning model to determine expected states for the scenarios in the search space. A scenario can be analyzed using a scoring function or a cost function to determine whether to prune the scenario (and scenarios depending therefrom) from the search space. According to various embodiments, the system uses the machine-learning model to simulate a placement for at least a subset of the combinations/permutations of placements (e.g., at each node in a tree structure representing the search space), and the system determines a corresponding score or cost (or expected stability or feasibility) for each scenario. In some embodiments, the system bounds the search space based on a combination of (i) modelling expected states for the scenarios and assessing a resulting score or cost, and (ii) determining scenarios that satisfy a scoring criteria (e.g., having a score greater than a scoring threshold) or a cost criteria (e.g., having a cost less than a cost threshold).

In some embodiments, the system implements a machine learning model to evaluate a state of a stack of items, and to evaluate the placement of one or more items on the stack of items.

Various embodiments comprise a system that picks and places a set of items to form a pallet that is stable and space efficient. In some embodiments, the system determines a location at which to place the set of items (e.g., a manner in which the set of items are arrange on a pallet) in order to maximize a predetermined scoring function (or minimize a predetermined cost function).

FIG. 1 is a diagram illustrating a robotic system to palletize and/or depalletize heterogeneous items according to various embodiments. In some embodiments, system 100 implements at least part of process 200 of FIG. 2, process 300 of FIG. 3, process 500 of FIG. 5, process 600 of FIG. 6, process 700 of FIG. 7, and/or process 800 of FIG. 8.

In the example shown, system 100 includes a robotic arm 102. In this example the robotic arm 102 is stationary, but in various alternative embodiments, robotic arm 102 may be fully or partly mobile, e.g., mounted on a rail, fully mobile on a motorized chassis, etc. As shown, robotic arm 102 is used to pick arbitrary and/or dissimilar items (e.g., boxes, packages, etc.) from a conveyor (or other source) 104 and stack them on a pallet (e.g., platform or other receptacle) 106. The pallet (e.g., platform or other receptacle) 106 may comprise a pallet, a receptacle, or base with wheels at the four corners and at least partially closed on three of four sides, sometimes referred to as a three-sided "roll pallet", "roll cage", and/or "roll" or "cage" "trolley". In other embodiments, a roll or non-wheeled pallet with more, fewer, and/or no sides may be used. In some embodiments, other robots not shown in FIG. 1 may be used to push receptacle 106 into position to be loaded/unloaded and/or into a truck or other destination to be transported, etc.

In some embodiments, a plurality of receptacles 106 may be disposed around robotic arm 102 (e.g., within a threshold proximity or otherwise within range of the robotic arm). The robotic arm 102 may simultaneously (e.g., concurrently and/or contemporaneously) stack one or more items on the plurality of pallets. Each of the plurality of pallets may be associated with a manifest and/or order. For example, each of the pallets may be associated with a preset destination (e.g., customer, address, etc.). In some instances, a subset of the plurality of pallets may be associated with a same manifest and/or order. However, each of the plurality of pallets may be associated with different manifests and/or orders. Robotic arm 102 may place a plurality of items respectively corresponding to a same order on a plurality of pallets. System 100 may determine an arrangement (e.g., a stacking of items) on the plurality of pallets (e.g., how the plurality of items for an order are to be divided among the plurality of pallets, how the items on any one pallet are to be stacked, etc.). System 100 may store one or more items (e.g., item(s) for an order) in a buffer or staging area while one or more other items are stacked on a pallet. As an example, the one or more items may be stored in the buffer or staging area until such time that system 100 determines that the respective placement of the one or more items on the pallet (e.g., on the stack) satisfies (e.g., exceeds) a threshold fit or threshold stability. The threshold fit or threshold stability may be a predefined value or a value that is empirically determined based at least in part on historical information. A machine learning algorithm may be implemented in connection with determining whether placement of an item on a stack is expected to satisfy (e.g., exceeds) a threshold fit or threshold stability, and/or in connection with determining the threshold fit or threshold stability (e.g., the thresholds against which a simulation or model is measured to assess whether to place the item on the stack).

In the example shown, robotic arm 102 is equipped with a suction-type end effector (e.g., end effector 108). End effector 108 has a plurality of suction cups 110. Robotic arm 102 is used to position the suction cups 110 of end effector 108 over an item to be picked up, as shown, and a vacuum source provides suction to grasp the item, lift the item from conveyor 104, and place the item at a destination location on receptacle 106. Various types of end effectors may be implemented.

In various embodiments, system 100 comprises a vision system that is used to generate a model of the workspace (e.g., a 3D model of the workspace and/or a geometric model). For example, one or more of 3D or other camera(s) 112 mounted on end effector 108 and cameras 114, 116 mounted in a space in which system 100 is deployed are used to generate image data used to identify items on conveyor 104 and/or to determine a plan to grasp, pick/place, and stack the items on receptacle 106 (or place the item in the buffer or staging area, as applicable). In various embodiments, additional sensors not shown may be used to identify (e.g., determine) attributes of an item, grasp the item, pick up the item, move the item through a determined trajectory, and/or place the item in a destination location on or in receptacle 106 items on conveyor 104 and/or other sources and/or staging areas in which items may be located and/or relocated, e.g., by system 100. Examples of such additional sensors not shown may include weight or force sensors embodied in and/or adjacent to conveyor 104 and/or robotic arm 102, force sensors in the x-y plane and/or z-direction (vertical direction) of suction cups 110.

In the example shown, cameras 112 are mounted on the side of the body of end effector 108, but in some embodiments, cameras 112 and/or additional cameras may be mounted in other locations, such as on the underside of the body of end effector 108, e.g., pointed downward from a position between suction cups 110, or on segments or other structures of robotic arm 102, or other locations. In various embodiments, cameras such as 112, 114, and 116 may be used to read text, logos, photos, drawings, images, markings, barcodes, QR codes, or other encoded and/or graphical information or content visible on and/or comprising items on conveyor 104.

In some embodiments, system 100 comprises a dispenser device (not shown) that is configured to dispense a quantity of spacer material from a supply of spacer material in response to the control signal. The dispenser device may be disposed on robotic arm 102, or within proximity of the workspace (e.g., within a threshold distance of the workspace). For example, the dispenser device may be disposed within the workspace of robotic arm 102 such that the dispenser device dispenses spacer material on or around receptacle 106 (e.g., pallet), or within a predetermined distance of end effector 108 of robotic arm 102. In some embodiments, the dispenser device comprises a mounting hardware configured to mount the dispenser device on or adjacent to an end effector 108 of robotic arm 102. The mounting hardware is at least one of a bracket, a strap, and one or more fasteners, etc. As an example, the dispenser device may comprise a biasing device/mechanism that biases supply material within the dispenser device to be ejected dispensed from dispenser device. The dispenser device may include a gating structure that is used to control the dispensing of spacer material (e.g., to prevent spacer material to be dispensed without actuation of the gating structure, and to permit dispensing of the spacer material to be dispensed in response to actuation).

The dispenser device may comprise a communication interface configured to receive a control signal. For example, the dispenser device may be in communication with one or more terminals such as control computer 118. The dispenser device may communicate with the one or more terminals via one or more wired connections and/or one or more wireless connections. In some embodiments, the dispenser device communicates information to the one or more terminals. For example, the dispenser device may send to control computer 118 an indication of a status of the dispenser device (e.g., an indication of whether the dispenser device is operating normally), an indication of a type of spacer material comprised in the dispenser device, an indication of a supply level of the spacer material in dispenser device (e.g., an indication of whether the dispenser device is full, empty, half full, etc.), etc. Control computer 118 may be used in connection with controlling the dispenser device to dispense a quantity of spacer material. For example, control computer 118 may determine that a spacer is to be used in connection with palletizing one or more items, such as to improve an expected stability of the stack of items on/in receptacle 106. Control computer 118 may determine the quantity of spacer material (e.g., a number of spacers, an amount of spacer material, etc.) to use in connection with palletizing the one or more items. For example, the quantity of spacer material to use in connection with palletizing the one or more items may be determined based at least in part on determining a plan for palletizing the one or more items.

In some embodiments, the dispenser device comprises an actuator configured to dispense a quantity of spacer material from a supply of spacer material in response to the control signal. In response to determining that a spacer/spacer material is to be used in connection with palletizing one or more items, control computer 118 may generate the control signal to cause the actuator to dispense the quantity of spacer material. The control signal may comprise an indication of the quantity of spacer material to be used as the spacer.

According to various embodiments, a spacer or a spacer material is a rigid block. For example, a spacer or a spacer material may be a rigid block of foam. In some embodiments, a spacer or a spacer material comprises polyurethane.

In some embodiments, the supply of spacer material comprises a plurality of precut blocks. The plurality of precut blocks may be preloaded into a spring-loaded cartridge that biases the plurality of precut blocks to a dispensing end. In response to a precut block being dispensed from the cartridge, another of the plurality of precut blocks is pushed to a next-in-line position to be dispensed from the cartridge.

In some embodiments, the supply of spacer material comprises one or more of a larger block of spacer material, a strip of spacer material, and a roll of spacer material. The dispenser device or system 100 may comprises a cutter that is configured to cut the quantity of spacer material from the supply of the spacer material. In response to the control signal being provided to the actuator, the actuator may cause the cutter to cut the quantity of the spacer material from the supply of the spacer material.

In some embodiments, the supply of the spacer material comprises a liquid precursor. In response to the control signal being provided to the actuator, the actuator causes the quantity of the spacer material to be dispensed onto a surface of a pallet or a stack of items on the pallet. The dispensed precursor may harden after being dispensed onto the surface of the pallet or the stack of items on the pallet.

In some embodiments the supply of spacer material comprises an extruded material. In response to the control signal being provided to the actuator, the extruded material is filled to one or more of a desired size and a desired firmness. The extruded material may be sealed in response to a determination that the extruded material is filled to the one or more of the desired size and the desired firmness. In some embodiments, the extruded material is filled with a fluid. The fluid may be one or more of air, water, etc. In some embodiments, the extruded material is filled with a gel.

In various embodiments, a robotically controlled dispenser tooling or machine fills the void between and/or adjacent to boxes to prepare the surface area for the next box/layer being placed. In some embodiments, system 100 may use a robotic arm 102 to pick/place predefined cut material and/or may dynamically trim the spacer material to fit the need of the surface area of the next item being placed. In some embodiments, the robotically controlled the dispenser device or the robotic palletization system comprising the robotically controlled dispenser device, comprises a device to trim to size a rectangular solid from a long tube and/or packaging, and place the rectangular solid on an existing pallet in connection with preparing the surface area for a next box or item which the system determines may not normally fit on the pallet surface area (e.g., on an upper surface of a previous layer). The spacer may include, without limitation, foam, an inflated air plastic packet, wood, metal, plastic, etc. The dispenser device may place (e.g., eject, dispense, etc.) the rectangular solid (e.g., the spacer) on the pallet directly, and/or the device may dispense the rectangular solid (e.g., the spacer) in proximity of the robotic arm, and the end effector may reposition/place the rectangular solid (e.g., the spacer) on the pallet surface area. The dispenser device may dispense a predetermined amount (e.g., a correct amount or an expected amount) of the spacer material to correct or improve the surface area discrepancy between boxes or items on the layer (e.g., on the upper surface of the layer) to prepare the surface area for a next box or item.

Referring further to FIG. 1, in the example shown system 100 includes a control computer 118 configured to communicate, in this example via wireless communication (but in one or both of wired and wireless communication in various embodiments) with elements such as robotic arm 102, conveyor 104, end effector 108, and sensors, such as cameras 112, 114, and 116 and/or weight, force, and/or other sensors not shown in FIG. 1. In various embodiments, control computer 118 is configured to use input from sensors, such as cameras 112, 114, and 116 and/or weight, force, and/or other sensors not shown in FIG. 1, to view, identify, and determine one or more attributes of items to be loaded into and/or unloaded from receptacle 106. In various embodiments, control computer 118 uses item model data in a library stored on and/or accessible to control computer 118 to identify an item and/or its attributes, e.g., based on image and/or other sensor data. Control computer 118 uses a model corresponding to an item to determine and implement a plan to stack the item, along with other items, in/on a destination, such as receptacle 106. In various embodiments, the item attributes and/or model is used to determine a strategy to grasp, move, and place an item in a destination location, e.g., a determined location at which the item is determined to be placed as part of a planning/replanning process to stack items in/on the receptacle 106.

In the example shown, control computer 118 is connected to an "on demand" teleoperation device 122. In some embodiments, if control computer 118 cannot proceed in a fully automated mode, for example, a strategy to grasp, move, and place an item cannot be determined and/or fails in a manner such that control computer 118 does not have a strategy to complete picking and placing the item in a fully automated mode, then control computer 118 prompts a human user 124 to intervene, e.g., by using teleoperation device 122 to operate the robotic arm 102 and/or end effector 108 to grasp, move, and place the item.

A user interface pertaining to operation of system 100 may be provided by control computer 118 and/or teleoperation device 122. The user interface may provide a current status of system 100, including information pertaining to a current state of the pallet (or stack of items associated therewith), a current order or manifest being palletized or de-palletized, a performance of system 100 (e.g., a number of items palletized/de-palletized by time), etc. A user may select one or more elements on the user interface, or otherwise provide an input to the user interface, to activate or pause system 100 and/or a particular robotic arm in system 100.

According to various embodiments, system 100 implements a machine learning process to model a state of a pallet such as to generate a model of a stack on the pallet. The machine learning process may include an adaptive and/or dynamic process for modeling the state of the pallet. The machine learning process may define and/or update/refine a process by which system 100 generates a model of the state of the pallet. The model may be generated based at least in part on input from (e.g., information obtained from) one or more sensors in system 100 such as one or more sensors or sensor arrays within the workspace of robotic arm 102. The model may be generated based at least in part on a geometry of the stack, a vision response (e.g., information obtained by one or more sensors in the workspace), and the machine learning processes, etc. System 100 may use the model in connection with determining an efficient (e.g., maximizing/optimizing an efficiency) manner for palletizing/de-palletizing one or more items, and the manner for palletizing/de-palletizing may be bounded by a minimum threshold stability value. The process for palletizing/de-palletizing the one or more items may be configurable by a user administrator. For example, one or more metrics by which the process for palletizing/de-palletizing is maximized may be configurable (e.g., set by the user/administrator).

In the context of palletizing one or more items, system 100 may generate the model of the state of the pallet in connection with determining whether to place an item on the pallet (e.g., on the stack), and selecting a plan for placing the item on the pallet, including a destination location at which the item is to be placed and a trajectory along which the item is to be moved from a source location (e.g., a current destination such as a conveyor) to the destination location. System 100 may also use the model in connection with determining a strategy for releasing the item, or otherwise placing the item on the pallet (e.g., applying a force to the item to snug the item on the stack). The modelling of the state of the pallet may include simulating placement of the item at different destination locations on the pallet (e.g., on the stack) and determining corresponding different expected fits and/or expected stability (e.g., a stability metric) that is expected to result from placement of the item at the different locations. System 100 may select a destination location for which the expected fit and/or expected stability satisfies (e.g., exceeds) a corresponding threshold value. Additionally, or alternatively, system 100 may select a destination location that optimizes the expected fit (e.g., of the item on the stack) and/or expected stability (e.g., of the stack).

Conversely, in the context of de-palletizing one or more items from a pallet (e.g., a stack on the pallet), system 100 (e.g., control computer 118) may generate the model of the state of the pallet in connection with determining whether to remove an item on the pallet (e.g., on the stack), and selecting a plan for removing the item from the pallet. The model of the state of the pallet may be used in connection with determining an order in which items are removed from the pallet. For example, control computer 118 may use the model to determine whether removal of an item is expected to cause stability of the state of the pallet (e.g., the stack) to drop below a threshold stability. System 100 (e.g., control computer 118) may simulate removal of one or more items from the pallet and select an order for removing items from the pallet that optimizes the stability of the state of the pallet (e.g., the stack). System 100 may use the model to determine a next item to remove from the pallet. For example, control computer 118 may select an item as a next item to remove from the pallet based at least in part on a determination that an expected stability of the stack during and/or after removal of the item exceeds a threshold stability. The model and/or the machine learning process may be used in connection with determining strategies for picking an item from the stack. For example, after an item is selected to be the next item to remove from the stack, system 100 may determine the strategy for picking the item. The strategy for picking the item may be based at least in part on the state of the pallet (e.g., a determined stability of the stack), an attribute of the item (e.g., a size, shape, weight or expected weight, center of gravity, type of packaging, etc.), a location of the item (e.g., relative to one or more other items in the stack), an attribute of another item on the stack (e.g., an attribute of an adjacent item, etc.), etc.

According to various embodiments, a machine learning process is implemented in connection with improving grasping strategies (e.g., strategies for grasping an item). System 100 may obtain attribute information pertaining to one or more items to be palletized/de-palletized. The attribute information may comprise one or more of an orientation of the item, a material (e.g., a packaging type), a size, a weight (or expected weight), or a center of gravity, etc. System 100 may also obtain a source location (e.g., information pertaining to the input conveyor from which the item is to be picked), and may obtain information pertaining to a pallet on which the item is to be placed (or set of pallets from which the destination pallet is to be determined such as a set of pallets corresponding to the order for which the item is being stacked). In connection with determining a plan for picking and placing the item, system 100 may use the information pertaining to the item (e.g., the attribute information, destination location, etc.) to determine a strategy for picking the item. The picking strategy may include an indication of a picking location (e.g., a location on the item at which the robotic arm 102 is to engage the item such as via the end effector). The picking strategy may include a force to be applied to pick the item and/or a holding force by which the robotic arm 102 is to grasp the item while moving the item from a source location to the destination location. System 100 may use machine learning processes to improve the picking strategies based at least in part on an association between information pertaining to the item (e.g., the attribute information, destination location, etc.) and performance of picking the item (e.g., historical information associated with past iterations of picking and placing the item or similar items such as items sharing one or more similar attributes).

According to various embodiments, system 100 may determine to use a spacer or a quantity of the spacer material in connection with palletizing one or more items in response to a determination that the use of the spacer or quantity of the spacer material will improve the result of an improved stack of items on the pallet (e.g., improve the stability of the stack of items). In some embodiments, the determination that the placing of the one or more spacers in connection with placing the set of N items on the pallet will result in an improved stack of items on the pallet is based at least in part on one or more of a packing density, a level top surface, and a stability. In some embodiments, the determination that the placing of the one or more spacers in connection with placing the set of N items on the pallet will result in an improved stack of items on the pallet is based at least in part on a determination that a packing density of the stack of items with the set of N items is higher than a packing density if the set of N items are placed on the pallet without the one or more spacers. In some embodiments, the determination that the placing of the one or more spacers in connection with placing the set of N items on the pallet will result in an improved stack of items on the pallet is based at least in part on a determination that a top surface is more level than a top surface if the set of N items are placed on the pallet without the one or more spacers. In some embodiments, the determination that the placing of the one or more spacers in connection with placing the set of N items on the pallet will result in an improved stack of items on the pallet is based at least in part on a determination that a stability of the stack of items with the set of N items is higher than a stability if the set of N items is placed on the pallet without the one or more spacers. N may be a positive integer (e.g., a positive integer less than a total number of items that are to be palletized in the complete pallet).

As an example, because N may be less than a total number of items that are to be palletized, system 100 may be limited in its optimization of the stack of items (e.g., robotic system 100 may only plan the placement of N items at a time). Accordingly, the use of one or more spacers increases the number of degrees of freedom associated with placing the N items. System 100 may use one or more spacers to optimize the stacking of the N items (or to achieve a "good enough" stack with the N items such as a stack that satisfies a minimum stability threshold). System 100 may use a cost function in connection with determining whether to use one or more spacers, a number of spacers to use, a placement of the spacers, etc. For example, the cost function may include one or more of a stability value, a time to place the one or more items, a packing density of the stack of items, a flatness value or degree of variability of the top of the upper surface of the stack of items, and a cost of supply material, etc.

According to various embodiments, control computer 118 controls system 100 to place a spacer on a receptacle 106 (e.g., a pallet) or a stack of items in connection with improving a stability of the stack of items on the receptacle 106. As an example, the spacer may be placed in response to a determination that a stability of the stack of items is estimated (e.g., likely such as a probability that exceeds a predefined likelihood threshold value) to be improved if the spacer is used. As another example, control computer 118 may control robotic system 100 to use the spacer in response to a determination that a stability of the stack of items is less than a threshold stability value, and/or that the stability of the stack of items is estimated to be less than a threshold stability value in connection with the placement of a set of items (e.g., a set of N items, N being an integer).

According to various embodiments, control computer 118 may determine the stability of a stack of items based at least in part on a model of a stack of items and/or a simulation of placing a set of one or more items. A computer system may obtain (e.g., determine) a current model of a stack of items, and model (e.g., simulate) the placing of a set of item(s). In connection with modeling the stack of items, an expected stability of the stack of items may be determined. The modelling of the stack of items may include modelling the placement of a spacer in connection with the modelling of the placement of the set of item(s).

In some embodiments, control computer 118 may determine the stability of the stack of items (or simulated stack of items) based at least in part on one or more attributes of a top surface of the stack of items (or simulated stack of items) and/or spacers. For example, a measure of an extent to which the top surface is flat may be used in connection with determining the stability of the stack of items. The placing of a box on a flat surface may result in a stable placement and/or stack of items. As another example, a surface area of a flat region on the top surface may be used in connection with determining the stability or expected stability of the placement of an item on the stack of items. The larger a flat region on a top surface of the stack of items is relative to a bottom surface of an item being placed on the stack of items, the greater the likelihood that the stability of the stack of items will satisfy (e.g., exceed) a threshold stability value.

According to various embodiments, system 100 generates a model of a pallet or a stack of one or more items on the pallet, and the spacer or spacer material is determined to be placed in connection with palletization of one or more items based at least in part on the model of the pallet or the stack of one or more items on the pallet. System 100 may generate a model of at least a top surface of a pallet or a stack of one or more items on the pallet, determine a set of N items to be placed next on the pallet (e.g., N being a positive integer), determine that placing one or more spacers in connection with placing the set of N items on the pallet will result in an improved stack of items on the pallet compared to a resulting stack of placing the set of N items without spacers, generate one or more control signals to cause the actuator to dispense the quantity of spacer material corresponding to the one or more spacers, and provide the one or more control signals to the actuator in connection with placing the set of N items on the pallet.

According to various embodiments, variation in items (e.g., types of items) among items to be palletized may complicate the palletization of the items in a stable manner (e.g., a manner according to which the stability of the stack of items satisfies a threshold stability value). In some embodiments, control computer 118 may only be able to forecast a certain number of items that are to be palletized. For example, the system may have a queue/buffer of N items to be palletized, where N is a positive integer. N may be a subset of a total number of items to be stacked on a pallet. For example, N may be relatively small in relation to the total number of items to be stacked on the pallet. Accordingly, system 100 may only be able to optimize the stacking of items using the next N known items. For example, system 100 may determine a plan to stack one or more items according to the current state of the stack of items (e.g., a current model) and one or more attributes associated with the next N items to be stacked. In some embodiments, the use of one or more spacers may provide flexibility in the manner in which the next N items are to be stacked and/or may improve the stability of the stack of items.

Various embodiments include palletization of a relatively large number of mixed boxes or items on a pallet. The various boxes and items to be palletized may have different attributes such as heights, shapes, sizes, rigidity, packaging type, etc. The variations across one or more attributes of the various boxes or items may cause the placement of the items on a pallet in a stable manner to be difficult. In some embodiments, system 100 (e.g., control computer 118) may determine a destination location (e.g., a location at which an item is to be placed) for an item having a greater surface area (e.g., a larger bottom surface) than the boxes or other items beneath the item being placed. In some embodiments, items having different heights (e.g., different box heights) may be placed on relatively higher areas of the pallet (e.g., a height greater than a height threshold value equal to a maximum pallet height multiplied by 0.5, a height greater than a height threshold value equal to a maximum pallet height multiplied by $2/3$, a height greater than a height threshold value equal to a maximum pallet height multiplied by 0.75, a height greater than a height threshold value equal to a maximum pallet height multiplied by another predefined value).

According to various embodiments, a machine learning process is implemented in connection with improving spacer material dispensing/usage strategies (e.g., strategies for using spacer material in connection with palletizing one or more items). System 100 may obtain attribute information pertaining to one or more items to be palletized/de-palletized and attribute information pertaining to one or more spacers to be used in connection with palletizing/de-palletizing the one or more items. The attribute information may comprise one or more of an orientation of the item, a material (e.g., a spacer material type), a size, a weight (or expected weight), or a center of gravity, a rigidity, a dimension, etc. System 100 may also obtain a source location (e.g., information pertaining to the input conveyor from which the item is to be picked), and may obtain information pertaining to a pallet on which the item is to be placed (or set of pallets from which the destination pallet is to be determined such as a set of pallets corresponding to the order for which the item is being stacked). In connection with determining a plan for picking and placing the item, system 100 may use the information pertaining to the item (e.g., the attribute information, destination location, etc.) to determine a strategy for palletizing the item (e.g., picking and/or placing the item). The palletizing strategy may include an indication of a picking location (e.g., a location on the item at which the robotic arm 102 is to engage the item such as via the end effector) and a destination location (e.g., a location on the pallet/receptacle 106 or stack of items). The palletizing strategy may include a force to be applied to pick the item and/or a holding force by which the robotic arm 102 is to grasp the item while moving the item from a source location to the destination location, a trajectory along which the robotic arm is to move the item to the destination location, an indication of a quantity, if any, of spacer material that is to be used in connection with placing the item at the destination location, and a plan for placing the spacer material. System 100 may use machine learning processes to improve the palletizing strategies based at least in part on an association between information pertaining to the item (e.g., the attribute information, destination location, etc.), and one or more of (i) performance of picking and/or placing the item (e.g., historical information associated with past iterations of picking and placing the item or similar items such as items sharing one or more similar attributes), (ii) performance of a stability of the stack of items after the item is placed at the destination location such as relative to an expected stability generated using a model of the stack of items (e.g., historical information associated with past iterations of palletizing the item or similar items such as items sharing one or more similar attributes), and (iii) performance of a stability of the stack of items after the item and/or spacer material is placed at the destination location such as relative to an expected stability generated using a model of the stack of items (e.g., historical information associated with past iterations of palletizing the item or similar items and/or spacers such as items/spacers sharing one or more similar attributes). In some embodiments, system 100 may use machine learning processes to improve the use of one or more spacers in connection with palletizing strategies based at least in part on an association between information pertaining to the spacers and/or one or more items that are palletized (e.g., the attribute information, destination location, etc.), and a stability performance of palletizing a set of items using one or more spacers relative to an expected stability of the palletizing of the set of items using the one or more spacers (e.g., the expected stability based on a simulation of the palletizing of the items using a model of the stack of items).

The model generated by system 100 can correspond to, or be based at least in part on, a geometric model. In some embodiments, system 100 generates the geometric model based at least in part on one or more items that have been placed (e.g., items for which system 100 controlled robotic arm 102 to place), one or more attributes respectively associated with at least a subset of the one or more items, one or more objects within the workspace (e.g., predetermined objects such as a pallet, a robotic arm(s), a shelf system, a chute, or other infrastructure comprised in the workspace, etc. The geometric model can be determined based at least in part on running a physics engine on control computer 118 to model a stacking of items (e.g., models a state/stability of a stack of items, etc.). The geometric model can be determined based on an expected interaction of various components of the workspace, such as an item with another item, an object, or a simulated force applied to the stack (e.g., to model the use of a forklift or other device to raise/move a pallet or other receptacle on which a stack of items is located).

According to various embodiments, the determination of placements of items (e.g., destination locations and orientations) is performed on an item-by-item basis. For example, system 100 may determine a location at which to place a current item based at least in part on one or more results of a scoring function corresponding to the potential placement of the current item at one or more potential locations/orientations. In some embodiments, system 100 does not use a simulation of performing placement of a subsequent item (e.g., to obtain a result of a scoring function for placing the subsequent item) in connection with determining a result of the one or more results of a scoring function corresponding to the potential placement of the current item at one or more potential locations. In other words, in some embodiments, the system may use limited knowledge of future or subsequent items in determining the placement of the current item. In some embodiments, system 100 models (e.g., simulates) estimated states for placement of a predefined number of placements (e.g., X placements, where X is a positive integer). System 100 bounds the search space for possible placements of a current item (e.g., a first next item) based on determining a set of placements that satisfy a criteria for possible placements. As an example, the criteria for possible placements can be a predefined scoring threshold according to a predefined scoring function. As another example, the criteria for possible placements can be a predefined cost threshold according to a predefined cost function.

In some embodiments, system 100 determines that an item is to be placed on a pallet. In response to determining that the item is to be placed, the system may obtain/determine a current state of the pallet/stack of items, and determine a placement (e.g., a destination location and/or orientation) according to which the item is to be placed. The determining of the placement according to which the item is to be placed may comprise determining the possible combinations of destination locations and orientations for which the item may be placed, and determining a corresponding value of a scoring function (or a cost function) associated with the pallet/stack of items if the item were to be placed at least at a subset of the possible locations. In response to determining the corresponding value of the scoring function, system 100 determines the placement according to which the item is to be placed based on the value of the scoring function associated with the placement. For example, system 100 selects the placement that yields a best result (e.g., a best placement according to the scoring function or the cost function). In response to determining the placement for the item, system 100 may determine a plan to move the item and place the item according to the placement (e.g., at the destination location and in the corresponding orientation, etc.). In response to determining the plan, system 100 controls robotic arm 102 to implement the plan to move the item and place the item at the destination location. According to various embodiments, the system may iteratively perform the determining the placement for an item for at least a plurality of a set of items to be picked and placed on the pallet (e.g., the set of items to be palletized). The system may also iteratively determine a plan to pick and place (e.g., palletize) an item and to control the robot to implement the plan to pick and place the item for at least a plurality of the set of items.

In some embodiments, the determining the possible locations at which the item may be placed is based at least in part edges of the pallet/stack of items. For example, on the top surface of the pallet (e.g., before any items are placed on the pallet), the edges may correspond to the circumference of the pallet. As another example, the edges on the top surface of the pallet (e.g., before any items are placed on the pallet) may be determined based on the corners of the pallet. If one or more items have been placed on the pallet, a top surface of the stack may be uneven (e.g., non-planar). The possible locations at which the item may be placed may be determined based at least in part on the edges of one or more of (i) edges of the pallet, and (ii) one or more edges of one or more items on the pallet/stack of items. In some embodiments, the possible locations at which the item may be placed may be determined based at least in part on the edges of one or more of (i) edges of the pallet, and (ii) corners of at least two edges of one or more items on the pallet/stack of items. In some embodiments, if one or more items have already been placed on the pallet, then the possible locations on which the item may be placed may comprise one or more of (i) pallet, and (ii) one or more surfaces of layers formed by an item(s) placed on the pallet. The determining locations at which the item may be placed is based at least in part determining one or more edges corresponding to (e.g., defining) surfaces on which an item may be placed. For example, one or more edges may be determined for various layers or surfaces formed by items already placed on the pallet (e.g., a top surface of one or more of the items already placed on the pallet).

According to various embodiments, an edge is determined based at least in part on a current model of the pallet (e.g., the estimated state). For example, a vision system corresponding to a workspace of the robot (e.g., robotic arm 102) that palletizes items on a pallet may obtain information from which sensor data may be determined. The sensor data may be used in connection with generating a model of the pallet. The model of the pallet/stack of items (e.g., the estimated state) may be based on a geometric model, sensor data obtained by a vision system of system 100, or a combination of the geometric model and the sensor data. System 100 may determine the estimated state based on (i) performing an interpolation with respect to the geometric model and the sensor data, and/or (ii) using a difference between the geometric model and the sensor data to identify anomalies and to determine which source of information to use for the corresponding part of the estimated state. In some embodiments, system 100 performs an analysis (e.g., an image analysis) on the model of the pallet. As an example, system 100 may perform an edge detection analysis to determine the edges in the model. The system may further process the model to determine edges corresponding to surfaces on which an item may be placed.

In some embodiments, a possible location is determined based on one or more vertices of one or more surfaces on the pallet and/or stack of items on the pallet. The one or more vertices may be determined based at least in part on the one or more edges. For example, a vertex may be a corner or point at which two edges meet.

According to various embodiments, in response to determining the possible locations and orientations according to which the item may be placed (e.g., based on the edges of the pallet, edges of the items on the pallet, and/or edges of the various surfaces on which the item may be placed such as edges formed by the items on the pallet), system 100 determines a set of feasible placements (e.g., locations, orientations, etc.) based at least in part on corresponding expected stability measures. As an example, system 100 may determine the set of feasible locations at least by removing from the possible locations those locations for which the item after placement (or a stack of items after placement of the item) is expected to be unstable. As another example, system 100 may determine the set of feasible locations at least by removing from the possible locations those locations for which an expected stability of the item after placement (or expected stability of a stack of items after placement of the item) is below a certain stability threshold. The stability threshold may be preconfigured and/or may be set such that only a set of N best locations remains in the set of feasible locations. N may be an integer, or a percentile of a total number of the possible locations.

According to some embodiments, the system determines a destination location at which to place the item based on the value of the scoring function associated with the destination location. In response to determining the set of feasible locations at which the item may be placed, the system may determine corresponding values of the scoring function associated with the locations comprised in the set of feasible locations. The scoring function may include weighted values associated with one or more of packing density, pallet/stack stability, time to complete palletization, time to complete placement of a set of items, etc. Values for other characteristics associated with the pallet/palletization process may be included in the function pertaining to the best placement. In some embodiments, the scoring function may include, or be used with, a cost function associated with moving the item to a particular location. The location in the set of feasible locations with the best score (e.g., a highest score) based on the scoring function may be selected as the destination location at which the item is to be placed.

According to various embodiments, the scoring function is indicative of a goodness of a pallet/stack of items. For example, the scoring function corresponds to an objective measure pertaining to one or more characteristics of the pallet/stack of items. The scoring function may include weighted values associated with one or more of packing density, pallet/stack stability, time to complete palletization, time to complete placement of a set of items, expected collisions, expected positioning of robotic arm 102 in an awkward position/pose, etc. Values for other characteristics associated with the pallet/palletization process may be included in the function pertaining to the best placement. In some embodiments, the scoring function is determined based on a parameterizing function comprising at least values or variables corresponding to a current pallet, a current item, and a placement location. According to various embodiments, the parameters of the scoring function are trained based on one or more machine learning methods.

In some embodiments, system 100 uses a model (e.g., a machine learning model) to obtain a score for a scoring function (or a cost for a costing function) to assess a placement (e.g., to determine a measure of goodness of the placement). System 100 may query the model for the score based on providing information pertaining to an estimated state of the pallet/stack of items (e.g., the current state) and information pertaining to the placement, such as attribute(s) of the item, a location at which item is to be placed according to the placement, and the orientation in which the item is placed according to the placement.

In some embodiments, the determining a placement (e.g., a location/orientation) according to which an item (e.g., a current item/first next item) is to be placed is based at least in part on a relatively small number (e.g., a predefined number) of next items to be placed (e.g., a small number of a next sequence of items to be placed). For example, the determining the placement according to which the item is to be placed is based at least in part on the current item (e.g., one or more attributes of the current item), a next item(s) (e.g., one or more attributes of such item(s)), and one or more edges corresponding to surfaces on which the current item and/or the next item(s) may be placed. In some embodiments, the scoring function is determined based on a parameterizing function comprising at least values or variables corresponding to a current pallet, a next item, and a placement location. According to various embodiments, the parameters of the scoring function are trained based on one or more machine learning methods.

According to various embodiments, the one or more machine learning methods used in connection with training the scoring function (e.g., training parameters in the scoring function) may include one or more of: a supervised learning, an unsupervised learning, a classification learning implementation, a regression learning implementation, a clustering implementation, etc. Examples of a classification learning implementation may include one or more of a support vector machines model, a discriminant analysis model, a naïve Bayes model, nearest neighbor model, etc. Examples of a regression learning implementation may include one or more of a linear regression GLM model, a support vector regression model, a Gaussian process regression model, an ensemble methods model, a decision tree model, a neural network model, etc. Examples of a clustering implementation include one or more of a K-means model, a K-Medoids model, a Fuzzy C-Means model, a hierarchical model, a Gaussian mixture model, a neural networks clustering model, a hidden Markov model, etc.

According to various embodiments, the system determines an estimated state of the stack of items. For example, system 100 determines the estimated state in response to placement of a next item, or in response to placement of N next items, etc. The estimated state can be determined based at least in part on one or more of a geometric model of the stack of items (or of the workspace) and/or sensor data (e.g., data obtained by the vision system of system 100).

In some embodiments, system 100 uses sensor data and geometric data (e.g., a geometric model) in connection with determining a location to place one or more items on a pallet (or in connection with depalletizing one or more items from a pallet). System 100 may use different data sources to model the state of a pallet (or a stack of items on a pallet). For example, system 100 estimates locations of one or more items on the pallet and one or more characteristics (or attributes) associated with the one or more items (e.g., a size of the item(s)). The one or more characteristics associated with the one or more items may include an item size (e.g., dimensions of the item), a center of gravity, a rigidity of the item, a type of packaging, a deformability, a shape, a location of an identifier, etc.

According to various embodiments, system 100 estimates a state (also referred to herein as an estimated state) of a workspace based at least in part on geometric data (e.g., a geometric model of the workspace) and sensor data (e.g., data obtained by one or more sensors deployed in a workspace). In response to obtaining the estimated state of the workspace, system 100 uses the estimated state in connection with moving an item in the workspace. For example, system 100 uses the estimated state to determine a plan and/or strategy for picking an item from a source location and placing the item at a target location (also referred to herein as a destination location). As another example, system 100 uses the estimated state to determine a placement of a next item.

According to various embodiments, the geometric model is determined based at least in part on one or more attributes for one or more items in the workspace. For example, the geometric model reflects respective attributes of a set of items (e.g., one or more of a first set that are palletized/stacked, and a second set of items that is to be palletized/stacked, etc.). Examples of an item include an item size (e.g., dimensions of the item), a center of gravity, a rigidity of the item, a type of packaging, a location of an identifier, a deformability of the item, a shape of the item, etc. Various other attributes of an item or object within the workspace may be implemented. As another example, the geometric model comprises an expected stability of one or more items stacked on or in the receptacle (e.g., a pallet). The geometric model may include an expected stability of a set of items (e.g., the stack of items) and/or an expected stability of individual items comprised in the stack of items. In some embodiments, system 100 determines an expected stability of an item based at least in part on (i) one or more attributes of the item; and (ii) one or more expected interactions with respect to the item and another item or object (e.g., a pallet) in the workspace. For example, system 100 may determine the expected stability based on a determination of an attribute of another item or object contact the item for which the expected stability is being computed. Examples of attributes of other items that may impact the expected stability of a particular item include rigidity, deformability, a size. As an example, if a particular item rests on another item that is rigid, the particular item is likely to have an improved expected stability as compared to a case where the particular item rests on another item that is not rigid or less rigid. As another example, if a particular item rests on another item that is deformable, such as comprised a soft packaging, the particular item is likely to have a lesser expected stability as compared to a case where the particular item rests on another item that is not deformable or less deformable. As another example, if a particular item rests on another item having a top surface area is greater than a bottom surface areas of the particular item, or if a relatively high percentage of a bottom surface of the particular item is supported by a top surface of another item, then the expected stability of the item is relatively high or at least higher than if the particular item has a top surface area smaller than a bottom surface area of the particular item, or if a relatively high percentage of the bottom surface of the particular item is not supported/interacting with a top surface of another item.

In some embodiments, system 100 adjusts the sensor data to account for noise (e.g., sensor noise). System 100 can estimate the noise comprised in the sensor data based at least in part on an empirical analysis of the vision system. For example, an empirical analysis of the performance of the vision system can be performed to determine noise captured in (e.g., inherent in) the sensor data. In some embodiments, system 100 stores a predetermined sensor noise profile associated with the vision system. System 100 can use the sensor noise profile in connection with adjusting the sensor data to account for the noise. For example, system 100 can apply an adjustment to cancel out the expected noise based at least in part on the sensor profile. The empirical analysis of the performance of the vision system can include (i) manually/physically measuring an item or a workspace, (ii) capturing the same using the vision system, and (iii) determining a difference between the manual/physical measurement of the item/workspace and the measurements of the same using the sensor data (e.g., using digital processing, etc.). System 100 may deem the difference between the manual/physical measurement of the item/workspace and the measurements of the same using the sensor data as the noise profile. As an example, system 100 determines a variance in the sensor data and determines the sensor noise profile based at least in part on the variance. The empirical analysis can be performed with respect to a statistically significant set of experiments/measurements. Examples of noise (or inaccuracies in the sensor data) may include (i) imprecision of an image at edges of the field of view of the vision system, (ii) glare/reflection from items or other objects in the workspace, etc.

In some embodiments, system 100 adjusts the geometric model to account for noise (e.g., geometric noise or imprecision arising from translation of the geometric model to the physical world such as via controlling a robotic arm). System 100 can estimate the noise comprised in the geometric model based at least in part on an empirical analysis of the precision of the robotic control or other objects within the workspace (e.g., estimated deformation of a pallet, deviations in placement of pallet versus a location used in the geometric model, etc.). For example, an empirical analysis of the performance of the control of the robotic arm (e.g., to perform a task such as placing an item) can be performed to determine noise captured in (e.g., inherent in) the geometric model. As an example, system 100 determines a variance in the geometric model and determines the geometric noise profile based at least in part on the variance. In some embodiments, system 100 stores a predetermined geometric noise profile associated with the vision system. System 100 can use the geometric noise profile in connection with adjusting the geometric model to account for the noise. For example, system 100 applies an adjustment to cancel out the expected noise comprised in the geometric model (e.g., noise generated based on controlling a robot, such as robotic arm 102, according to a plan determined based on the geometric model).

In some embodiments, system 100 updates the geometric model after movement (e.g., placement) of each item. For example, system 100 maintains (e.g., stores the geometric model) the geometric model corresponding to a state of the workspace such as a state/stability of a stack of items and location of one or more items among the stack of items. The geometric model uses a current geometric model in connection with determining a plan to move an item, and controlling a robotic arm to move an item. In response to movement of the item, system 100 updates the geometric model to reflect the movement of the item. For example, in the case of de-palletizing a stack of items, in response to a particular item being picked and moved from the stack of items, system 100 updates the geometric model such that the particular item is no longer represented as being on the stack and is comprised in the geometric model at a destination location at which the particular item was placed, or in the event that the destination location is outside the workspace, the geometric model is updated to remove the item. Further, the geometric model is updated to reflect a stability of the stack of items after the particular item has been removed from the stack. As another example, in the case of palletizing a set of items, system 100 updates the geometric model to reflect placement of a particular item on/among a stack of items. System 100 can update the geometric model to include an updated stability of the stack of items based at least in part on the placement of the item on/among the stack of items (e.g., to reflect the interaction that the particular item has with other items or interaction among other items based on placement of the particular item, etc.).

In some embodiments, system 100 updates the current state (e.g., updates based on an update to the geometric model) after (i) movement (e.g., placement) of a predetermined number of items, or (ii) the earlier of movement of the predetermined number of items or detection of an anomaly such as an anomaly that satisfies one or more anomaly criteria (e.g., the extent of the anomaly exceeds an anomaly threshold, etc.). The predetermined number of items (e.g., X items, where X is a positive integer) can be set based on user preferences, a robot control system policy, or otherwise determined based on empirical analysis of a placement(s) of items. As an example, the predetermined number of items is set based on a determination that the number of items results in an optimal/best result with respect to a predetermined cost function (e.g., a cost function reflecting an efficiency, a stability, expected change in stability, etc.). As an example, system 100 determines a current estimated state and uses the current estimated state to determine a plan for moving the next X items, and after moving the X items (e.g., the stacking or de-stacking of the items) system 100 determines an updated estimated state (e.g., a geometric update/model to reflect placement of the X items). System 100 determines the updated state based at least in part on a combination of the geometric model and the sensor data (e.g., a current geometric model and current sensor data, etc.). System 100 then uses the updated state in connection with determining a plan and controlling a robotic to place a next set of items in accordance with the plan.

In some embodiments, the frequency by which system 100 updates estimated state is dynamically determined. For example, system 100 dynamically determines the value X corresponding to the number of items after movement of which the system updates the estimated state. In some embodiments, system 100 dynamically determines the value X (e.g., corresponding to an update frequency of the estimated state) based at least in part on one or more attributes of items (e.g., an attribute of a previously moved/placed item, and/or an attribute of an item to be moved). As an example, system 100 dynamically determines the value X based on a determination that an irregularly placed item or deformable item was placed before (e.g., immediately before, etc.) the set of X items are placed using the current estimated state, or the set of X items comprises an irregularly shaped item or deformable item.

In connection with determining placements (e.g., plans corresponding to the placements) for a set of items and controlling robotic arm 102 to pick and place the set of items in accordance with the placements, system 100 determines a state space, an action space, and a search space. System 100 determines the search space based at least in part on determining various placement locations and/or orientations for the set of items (e.g., a current item and a preset number of next items). System 100 can further determine the search space based on a change in an order of placement of items in the set of items if system 100 is configured to permit a buffering of one or more items.

Determining a plan for picking and placing a set of items (e.g., palletizing the set of items) includes determining a placement location (e.g., a destination location at which the item is to be placed) and an orientation according to which the item is to be placed. In some embodiments, the determining, or updating, the plan for picking and placing a set of one or more items includes assessing various placement locations and orientations for items in the set of items. System 100 determines a search space based on (i) a state space for a state of the pallet or other location at which the set of items are to be placed, and (ii) an action space corresponding to the placement of the respective items in the set of items at the corresponding destination locations and orientations. For example, system 100 determines a set of plans for palletizing the set of items by determining corresponding placements (e.g., placement locations and orientations, etc.) for each item comprised in the set of items. As another example, system 100 determines a plurality of combinations/permutations of placements (e.g., placement locations and orientations, etc.) for each item in the set of items (or N items of the set of items, N being an integer). The determining the plan can further comprise determining one or more characteristics (e.g., expected stability, score for a scoring function, cost for a costing function, etc.) of the stack of items comprising at least part of the set of items placed in the corresponding destination locations and orientations. In some embodiments, system 100 performs a plurality of simulations respectively corresponding to the various combinations/permutations for placing/orienting the set of items. In some embodiments, system 100 uses a model (e.g., queries a model) to assess the various combinations/permutations for placing/orienting the set of items. System 100 can query the model to assess each placement, and can use a result provided by the analysis using the model to determine a placement according to which the item is to be placed (e.g., to select the best placement). The plan is determined based at least in part on a best (e.g., optimal such as having a highest score for a scoring function, or a lowest cost for a cost function, etc.) combination/permutation of destination locations and orientations. The best combination/permutation of destination locations and orientations may be selected based on a cost function such that a cost of the best combination/permutation is the lowest cost combination/permutation or less than a cost threshold (e.g., an absolute threshold, a percentile of costs among the various costs for the different combinations/permutations, etc.). The best combination/permutation of destination locations and orientations may be selected based on a scoring function such that a score of the best combination/permutation is greater than a scoring threshold (e.g., an absolute threshold, a percentile of costs among the various costs for the different combinations/permutations, etc.).

In some embodiments, system 100 determines a search space for placement of a set of N next items, where N is a positive integer. As an example, if items are delivered to a workspace for a robot to pick and place at destination locations, system 100 may be able to determine the next M items to be placed, where M is a positive integer. M is greater than or equal to N (e.g., the next N items may be a subset of the next M items). System 100 may determine the next M items based on sensor data obtained by one or more sensors (e.g., the vision system) in the workspace. In some embodiments, system 100 determines the next N items based on a manifest or other predefined list of items that are to be picked and placed (e.g., palletized).

In some embodiments, system 100 represents the search space as a tree according to which each node corresponds to a different combination of placements for the set of items. System 100 determines the search space based at least in part on a state space and an action space. The state space corresponds to a current state of the workspace (e.g., a current state of the pallet). The action space corresponds to a space defined by the placement(s) of a set of items (e.g., placement locations and orientations, etc.). The root node is a current state of the workspace (e.g., a current state of the pallet). The first step after the root node corresponds to branches/nodes for the various permutations of placement locations and orientations for placement of the first next item. The second step after the root node corresponds to branches/nodes for the various permutations of placement locations and orientations of the second next item.

In some embodiments, system 100 represents the search space as a Markov decision process according to which each node corresponds to a different combination of placements for the set of items. For example, if system 100 does not have knowledge of the full set of items that are to be picked and placed, system 100 implements a Markov decision process because there is uncertainty with respect to future items to be picked and placed.

The placement of the set of items (e.g., destination locations and orientations) is selected by performing a search within the search space. For example, system 100 performs a search within the search space to identify the best/lowest cost solution or a good-enough solution such as a solution that satisfies a predefined cost threshold. As another example, system 100 performs a search within the search space to identify the placement having a highest corresponding score for a scoring function. However, traversing the entire search space including all possible combinations of placement locations and orientations can be extremely computationally expensive and can add significant latency into the determination of a plan for placing an item(s). For example, in the case that the search space is represented as a tree, the traversing the various branches of the tree can be inefficient. The search space can grow exponentially as the number of items increases and the pallet size increases, etc. In some embodiments, system 100 bounds the search space within which system 100 selects a placement(s) (e.g., placement location, orientation, etc.). However, bounding the search space too much can lead to a suboptimal number of combinations/permutations of placements for a set of items from which a placement of a next item is to be determined.

According to various embodiments, system 100 bounds the search space to obtain a more computationally reasonable search space (e.g., to find a more computationally reasonable way to determine an optimal position for an item to be placed). In the case of the search space represented as a tree, system 100 determines a manner by which to prune the tree, and system 100 prunes the tree. As an example, the pruning the tree includes bounding the search space of the tree such that system 100 excludes from consideration as possible placement locations/orientations those states corresponding to pruned branches/nodes. In some embodiments, system 100 restricts analysis of potential placements (locations and orientations), or searches for a best placement (e.g., best combination/permutation of destination locations and orientation, best destination location and orientation for placement of the next item to result in a stable placement of the next set of items, etc.) to those placements in the search space that have not been pruned.

In some embodiments, system 100 prunes the search space (e.g., the tree) based at least in part on querying a model with respect to the various parts of the search space (e.g., query the model for a score with respect to a scoring function, or a cost with respect to a cost function). As an example, each node in the tree corresponds to placement of an item at a particular placement location and an orientation. In some embodiments, system 100 uses the model to assess the placement (e.g., queries the model) in accordance with the placement location and orientation of item(s) corresponding to a particular node in the tree. In response to using the model to assess the placement for a particular node, system 100 determines whether to prune the tree at such node. System 100 can determine to prune the tree at such node based at least in part on a score for a scoring function, a cost for a cost function, or another attribute pertaining to an expected state of the workspace (e.g., an expected stability of a stack of items, a packing density of the stack of items, etc.) in response to the placement of the item (e.g., the search space may be pruned to remove/rule out placements that are deemed physically unstable). The scoring function or cost function can be based at least in part on one or more of (i) an expected stability of the stack of items, (ii) a time for completion of the stack of items, (iii) a satisfaction of whether the stack of items satisfies a predefined criteria or heuristic (e.g., deformable members placed towards the top of the stack, heavy items placed towards the bottom of the stack, irregularly shaped items placed towards the top of the stack, etc.), (iv) collision avoidance or an expected collision (e.g., a determination of whether a trajectory to the placement location would lead to a collision between the item or robotic arm and another), (v) an efficiency of moving the item(s), and (vi) an indication of whether the robot is expected to be configured in an awkward pose when picking, moving, or placing the item for the placement.

In some embodiments, for each node in the tree (or Markov decision process) system 100 queries the model to determine a score or cost associated with placing the corresponding item in accordance with the placement at the node. System 100 traverses the tree beginning at the root node, and then following branches from the root node to higher-order levels of the tree. As system 100 reaches a particular node during traversal of the tree, system 100 queries the model to determine the score or cost associated with the corresponding placement, and determines whether to prune the particular node (and any downstream nodes that branch directly or indirectly from the particular node). For example, system 100 determines whether to prune the node based at least in part on comparing the score associated with the scoring function with a predefined scoring threshold. If the score is less than the scoring threshold, system 100 determines to prune the node.

Various embodiments use information pertaining to an attribute of a scenario (e.g., a score for a scoring function, a cost for a cost function, an expected stability of the stack of items, etc.) in connection whether to prune such node from the tree (or Markov decision process). For example, system 100 traverses the tree starting from the root node, and system 100 iteratively determines for the next nodes whether the placement is favorable/feasible (e.g., a cost less than a cost threshold, a score for a scoring function above a scoring threshold, etc.). In response to determining that placement is favorable/feasible at a particular node, system 100 can proceed to a next level node (e.g., a node branching from the particular node) and determine whether the stack is expected to be favorable/feasible at the next-level node. In response to determining that a particular node is expected to be unfavorable/infeasible system 100 prunes the node. In some embodiments, in response to determining that a particular node is expected to be unfavorable/infeasible system 100 prunes the node and all next-level nodes branching (directly or indirectly) from the particular node.

In some embodiments, system 100 is configured to permit/enable buffering of items, and system 100 determines the search space based at least in part on the combination/permutations of placements of items, including changing an order of placement of items up to a threshold buffer amount. For example, if system 100 is configured to permit buffering of up to two items, system 100 may determine the search space based on selection, from the next three items to be placed, of the first next item to place. System 100 may determine nodes in the search space for each placement order and corresponding combinations/permutations of placement locations and orientations.

In some embodiments, system 100 is configured to not permit/enable buffering of items, and system 100 determines the search space based at least in part placement of each next item in the order the set of items are provided to the workspace (e.g., to the robot such as via a conveyor).

Using a machine learning model to evaluate a state of a pallet/stack of items and to simulate placements (e.g., next actions) enables system 100 to prune the search space (e.g., the tree) using machine learning techniques. In some embodiments, the machine learning model evaluates and scores/weights potential outcomes of a placement based on historical information (e.g., what system 100 has seen before, or based on the training data for the model). The model scores a current state of the pallet/stack of items and placements, and system 100 determines the best placement (e.g., system 100 uses the respective scores to determine the best placement). The model can be trained based on simulating (e.g., simulating using a geometric model, or simulating using physical trials) various placements of various items, and providing a reward (e.g., an indication of goodness) when a simulation provides a good outcome (e.g., a stable stack of items), and a negative reward (e.g., an indication that the state of the pallet is unfavorable/infeasible) when simulation provides a bad outcome (e.g., an unstable stack of items, a stack of items having a low packing density, an irregularly shaped item being placed at or near the bottom of the stack of items, etc.). The simulation of various placements of various items includes performing simulations with different locations, orientations, and items (e.g., items having one or more different attributes), etc.

In response to traversing the search space (e.g., pruning the search space to remove unfavorable/infeasible placements), the system performs a tree search to determine the best placement. For example, system 100 performs a Monte Carlo tree search to evaluate/determine the best placement among the pruned search space.

According to various embodiments, system 100 determines the plan (e.g., a destination location and orientation) for placing the first next item based at least in part on a determination of a best placement of the next N items (e.g., a placement having a highest expected stability and/or lowest cost, etc.). System 100 then controls a robot to pick and place the first next item in accordance with plan. In response to placing the first next item, system 100 determines a search space for placing the second next item and following items. For example, the search space has a root node corresponding to a stack of the items, wherein the stack of items includes the first next item; the first level nodes of the search space correspond to placements of the second next item. System 100 then determines the expected stability (or impact to the stability) of the stack of items for the nodes within the search space, determines whether/how to prune the search space, and selects the best placement (e.g., highest expected stability, lowest cost, etc.) for the second next item. According to various embodiments, system 100 can iteratively determine the search space, prune the search space, and determine placement of an item for each of the items in the set of items to be placed.

In some embodiments, the system comprises a plurality of zones in which pallets are respectively disposed. The system can contemporaneously determine a pallet/stack of items on which a particular item is to be placed, and pick and place the item to a selected pallet.

Although the foregoing example is discussed in the context of a system palletizing a set of items on one or more pallets, the robotic system can also be used in connection with depalletizing a set of items from one or more pallets.

Figure 2:
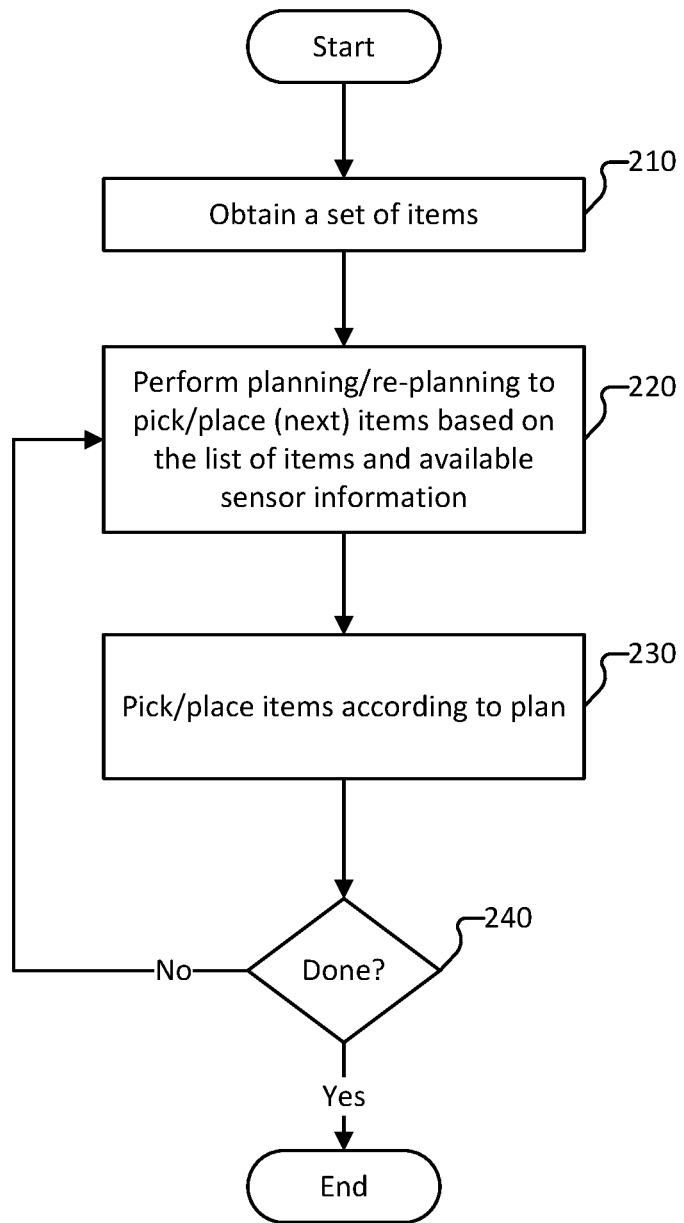
FIG. 2 is a flow chart illustrating a process to palletize one or more items according to various embodiments.

FIG. 2 is a flow chart illustrating a process to palletize one or more items according to various embodiments. In some embodiments, process 200 is implemented at least in part by system 100 of FIG. 1.

At 210, a set of items is obtained. The set of items may correspond to a set of items that are to be collectively palletized on one or more pallets. According to various embodiments, a set of items to be palletized is determined based at least in part on an indication that a manifest or order is to be fulfilled. For example, in response to receiving an order, a list of items for the order may be generated. As another example, a list of items corresponding to a plurality of orders to be sent to the same recipient may be generated.

The items may be located on a shelf or other location within a warehouse. In order to palletize the items, the items are moved to a robotic system that palletizes the items. For example, the items may be placed on one or more conveyors that move the items to within range of one or more robotic arms that palletize the items onto one or more pallets. In response to obtaining the list of items, at least some of the items are associated with a particular robotic arm, a predefined zone corresponding to the particular robotic arm, and/or a particular pallet (e.g., a pallet identifier, a pallet located in a predefined zone), etc.

At 220, planning (or re-planning) is performed to generate a plan to pick/place items based on the list of items and available sensor information. The plan may include a one or more strategies for retrieving one or more items on the list of items and placing such items on the corresponding one or more conveyors to carry the items to a robotic arm. According to various embodiments, an order in which the items on the list of items are to be provided to the applicable robotic arm for palletizing is determined based at least in part on the list of items.

The order in which the items are placed on the conveyor may be at least loosely based on the items and an expected stack of the items on one or more pallets (e.g., a modeled estimated state). For example, the system that determines the order in which to place the items may generate a model of an expected stack(s) of the items, and determine the order based on the model (e.g., so as to first deliver items that form the base/bottom of the stack and progressively deliver items higher up the stack). As another example, the system that determines the order in which to place the items may evaluate the state of the stack of items and placement of the items using a machine learning model, and determine the order based on performing a tree search for a scenario (e.g., sequence of items, location of items, orientations of items) that yields a best result (e.g., having a highest score for a scoring function).

In some embodiments, the system determining the order in which to place the items on the conveyor may generate a model of an expected stack(s) of the items, and determine the order based on the model (e.g., so as to first deliver items that form the base/bottom of the stack and progressively deliver items higher up the stack). The system may query a machine learning model to determine the states or information pertaining to the expected stack of items. In the case that the items on the list of items are to be palletized on a plurality of pallets, items that are expected to form the base/bottom of the respective stacks (or otherwise be relatively near the bottom of the stacks) may be placed before items that are expected to be substantially in the middle or top of the stacks. Various items that are to be palletized on the plurality of pallets may be interspersed among each other and the robotic system may sort the items upon arrival at the robotic arm (e.g., the robotic arm may pick and place the items onto an applicable pallet based at least on the item such as the identifier of the item or an attribute of the item). Accordingly, the items corresponding to the base/bottom portion of the corresponding stacks may be interspersed among each other and various items for each pallet/stack may be placed on the conveyor as the corresponding stack is built. The system may implement a tree search (e.g., a tree of a search space) to determine a sequence of items that yields a best stack of items (e.g., based on an evaluation of the expected stacks of items using a machine learning model), and the system then controls the order in which the items are to be placed on the conveyor and delivered to the robotic arm performing the palletization to generate the stack of items.

The system may generate a model of one or more expected stacks for the items belonging to the list of items. The model may be generated based at least in part on one or more thresholds such as a fit threshold value or stability threshold value, other packing metric (e.g., density), etc. For example, the computer system can generate a model of a stack of items for which an expected stability value satisfies (e.g., exceeds) the stability threshold value. The model may be generated using a machine learning process. The machine learning process may be iteratively updated based on historical information such as previous stacks of items (e.g., attributes of items in previous stacks, performance metrics pertaining to the previous stacks such as stability, density, fit, etc.). In some embodiments, the model of the stack(s) for palletizing the items on the list of items is generated based at least in part on one or more attributes of the items.

Various attributes of an item may be obtained before or during the determining of the plan. Attributes may include a size of an item, a shape of an item, a type of packaging of an item, an identifier of an item, a center of gravity of an item, an indication of whether the item is fragile, an indication of a top or bottom of the item, an indication of whether the item is deformable, etc. As an example, one or more attributes pertaining to at least a subset of the items may be obtained based at least in part on the list of items. The one or more attributes may be obtained based at least in part on information obtained by one or more sensors, and/or by performing a lookup in a mapping of attributes to items (e.g., item types, item identifiers such as serial numbers, model numbers, etc.).

In some embodiments, the generating the model of one or more expected states for the items belonging to the list of items includes generating (e.g., determining) an estimated state for the workspace (e.g., a workspace comprising one or more stacks of items). The computer system determines a plan for moving (e.g., palletizing or depalletizing, etc.) a set of one or more items, and the computer system controls a robot (e.g., a robotic arm) to move the set of one or more items according to the plan. In response to moving the set of one or more items according to the plan, the computer system determines an estimated state for the workspace. For example, the computer system updates the estimated state based at least in part on the movement of the set of items. In some embodiments, the estimated state is determined based at least in part on the geometric model or the sensor data, or a combination of the geometric model and the sensor data in response to a determination that the geometric model and the sensor data are incongruent (e.g., that a difference between the geometric model and the sensor data is greater than a predetermined difference threshold, or comprise an anomaly, etc.). The updated/current estimated state reflects the movement of the set of one or more items (e.g., in the case of palletizing, the updated estimated state includes information pertaining to the placement of the set of one or more items on the stack(s), etc.). In response to determining the updated/current estimated state, the computer system determines a plan for moving another set of one or more items, and the computer system controls the robot to move the other set of one or more items according to the plan.

In some embodiments, the computer system updates the current state (e.g., updates based on an update to the geometric model) after (i) movement (e.g., placement) of a predetermined number of items, or (ii) the earlier of movement of the predetermined number of items or detection of an anomaly such as an anomaly that satisfies one or more anomaly criteria (e.g., the extent of the anomaly exceeds an anomaly threshold, etc.). The predetermined number of items (e.g., X items, X being a positive integer) can be set based on user preferences, a robot control system policy, or otherwise determined based on empirical analysis of placement of items. As an example, the predetermined number of items is set based on a determination that the number of items results in an optimal/best result with respect to a predetermined cost function (e.g., a cost function reflecting an efficiency, a stability, expected change in stability, etc.). As an example, the computer system determines a current estimated state and uses the current estimated state to determine a plan for moving the next X items, and after moving the X items (e.g., the stacking or de-stacking of the items), the computer system determines an updated estimated state (e.g., a geometric update/model to reflect placement of the X items). The computer system determines the updated state based at least in part on a combination of the geometric model and the sensor data (e.g., a current geometric model and current sensor data, etc.). The computer system then uses the updated state in connection with determining a plan and controlling a robotic to place a next set of items in accordance with the plan.

According to various embodiments, the computer system determines the estimated state based at least in part on performing an interpolation between the geometric model and the sensor data. For example, the system performs the interpolation for a particular part of a geometric model and a corresponding part of the sensor data (e.g., the particular part may correspond to a difference between the geometric model and the sensor data that exceeds a difference threshold, or comprises an anomaly).

Various interpolation techniques may be implemented. The particular part of the geometric model may correspond to a particular point (or set of points) in the point cloud for the geometric model, and the corresponding part of the sensor data may be the sensor data for that particular point in the point cloud for the geometric model, etc. In some embodiments, the system performs an adaptive interpolation between the geometric model and the sensor data. In some embodiments, the system performs a non-adaptive interpolation between the geometric model and the sensor data. Examples of adaptive interpolation processing includes: nearest neighbor, bilinear, bicubic, spline, sinc, lanczos, etc. Various other interpolation processing may be performed in connection with determining an estimated state.

In some embodiments, the system uses the current estimated state in connection with determining a next placement (e.g., a placement of a next item of a set of items to be placed). For example, the system determines a search space of possible placements for a next item based at least in part on the estimated state. In some embodiments, the system uses the estimated state as the root node of the search space (e.g., a tree structure representing the search space, or a Markov decision process, etc.), and the system determines the various combinations/permutations of a next item or a set of items (e.g., a set of N items to be placed next).

In response to determining the search space, the system determines whether to prune the search space such as based on a quality of service or other criteria for an amount of resources or latency that is to be allocated to determine a plan for placement of a next item. The system prunes the search space to remove combinations/permutations of placements for a set of items that correspond to sub-optimal placements (e.g., placements that are expected to lead to an unstable stack of items, or the cost for such placements exceeds a predefined cost threshold, etc.). In response to pruning the search space, the system assesses the remaining combinations/permutations of placements in the search space to identify a best placement (e.g., a placement of a next item that is expected to yield a best placement for a set of items, such as a set of N next items). The best placement may be determined based at least in part on one or more of a scoring function, a cost function, an expected stability of the stack, etc.

In response to determining the placement for the next item, the system determines a plan for placing the item at the corresponding destination location and associated orientation.

At 230, items are picked and moved through a (predetermined/planned) trajectory to a location near where the item is to be placed on the corresponding conveyor, and placed at the destination location according to the plan determined and/or updated at 220.

In the example shown, (re-)planning and plan implementation (220, 230) continue until the high-level objective of providing the items on the list of items is completed (240), at which the process 200 ends. In various embodiments, re-planning (220) may be triggered by conditions such as arrival of items that are not expected and/or cannot be identified, a sensor reading indicating an attribute has a value other than what was expected based on item identification and/or associated item model information, etc. Other examples of unexpected conditions include, without limitation, determining that an expected item is missing, reevaluating item identification and determining an item is other than as originally identified, detecting an item weight or other attribute inconsistent with the item as identified, dropping or needing to re-grasp the item, determining that a later-arriving item is too heavy to be stacked on one or more other items as contemplated by the original and/or current plan, and detecting instability in the set of items as stacked on the receptacle.

Figure 3:
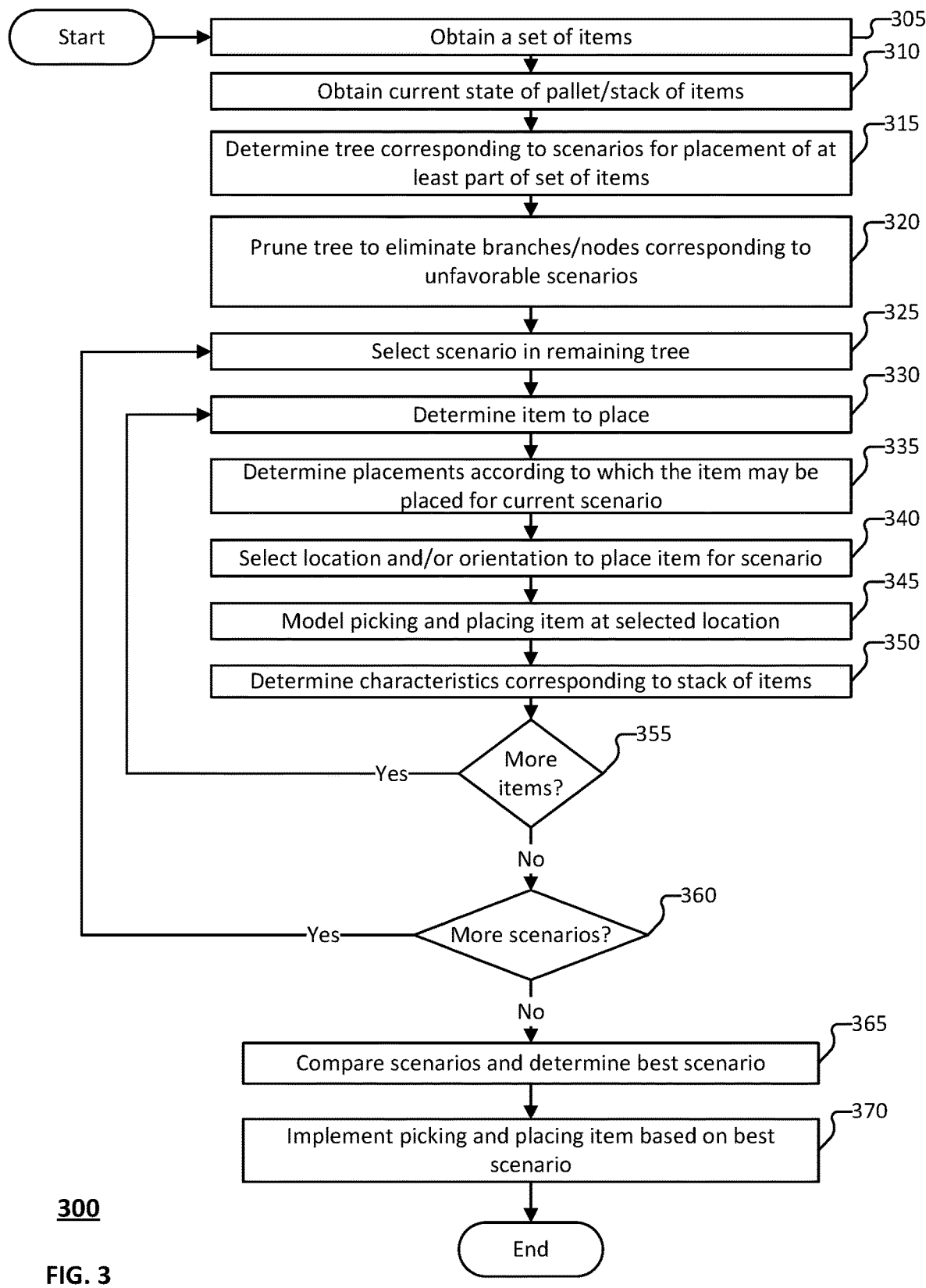
FIG. 3 is a flow chart illustrating a process to determine a plan to move items according to various embodiments.

FIG. 3 is a flow chart illustrating a process to determine a plan to move items according to various embodiments. In some embodiments, process 300 is implemented at least in part by system 100 of FIG. 1.

At 305, a set of items is obtained. In some embodiments, the set of items is determined based at least in part on sensor data such as information obtained by a vision system in the workspace. The system determines the next items to be placed based at least in part on the sensor data (e.g., the system determines the next N items being delivered to the workspace for palletization, etc.). In some embodiments, the set of items is determined based at least in part on a predefined manifest or list of items that are to be picked and placed.

At 310, a current state of the pallet or stack of items is obtained. In some embodiments, the system determines a current estimated state of the pallet or stack of items. The system can determine the estimated state based on using a geometric model for the stack of items, sensor data of the workspace, or a combination of the geometric model and the sensor data. For example, the system performs an interpolation with respect to the geometric model and the sensor data to determine the estimated state.

In some embodiments, the system uses a machine learning model to model the current state of the pallet or stack of items and to determine information associated with the stack of items, such as packing density, stability, time to complete placements, etc.

At 315, the system determines a tree corresponding to scenarios for placement of at least part of the set of items. In some embodiments, the system determines a search space corresponding to the various combinations/permutations of placement (e.g., placement location and orientation) of the next N items.

At 320, the tree is pruned to eliminate branches and/or nodes corresponding to unfavorable scenarios. In some embodiments, 320 is performed after 350.

In some embodiments, the system determines branches/nodes corresponding to placement(s) that are expected to yield an unstable stack of items (e.g., an expected stability less than a predefined stability threshold, a heuristic indicates that the stack of items is expected to be unstable, etc.) or that the placement(s) are expected to have a cost (e.g., according to a predefined cost function) that exceeds a cost threshold. In response to determining branches/nodes corresponding to placement(s) expected to yield an unstable stack of items or a cost that exceeds a threshold cost, the system determines to prune such placements from the search space. For example, the system excludes such placements from further analysis.

In some embodiments, the system traverses the search space (e.g., the tree) and determines scenarios (e.g., nodes corresponding to placements) that yield an unfavorable/infeasible result. The system determines that a scenario is unfavorable/infeasibility based on a determination of a score for a predetermined scoring function or a cost for a predetermined cost function. As an example, the system compares the score for a scenario to a scoring threshold, and if the score is less than the scoring threshold, the system deems the scenario as unfavorable/infeasible.

At 325, a scenario in the remaining tree is selected. In some embodiments, the system selects a combination/permutation of placements in the pruned search space. The system may iterate over 325-360 until all scenarios remaining in the pruned search space are analyzed. In some embodiments, the scenario corresponds to a node in a tree structure representing the search space. In some embodiments, the scenario corresponds to a node in a Markov decision process representing the search space.

At 330, an item to place is determined. In some embodiments, the system determines the next item to place. In some implementations, the system may permit buffering of items, and in such an implementation the system determines the next item from among the set of next items that fit within the buffer criteria.

At 335, the placements according to which the item may be placed for the current scenario are determined. The placements can correspond to the various placement locations and orientations according to which the item may be placed.

At 340, a location and/or orientation to place the item for the scenario is selected. As an example, the system selects a node in the search space corresponding to placement of the item, and determines the location and/or orientation corresponding to the selected node.

At 345, picking and placing the item is modeled. In some embodiments, in response to selecting a placement of the item (e.g., determining a placement corresponding to a node in the search space), the system uses (e.g., queries) a machine learning model to model the state of the pallet/stack of items and/or the placement of the item according to the scenario. In some embodiments, the system uses the machine learning model to determine a score for the scenario (the placement of the item(s)) based on a scoring function.

At 350, one or more characteristics corresponding to the stack of items are determined. For example, the system determines the characteristics of the stack of items corresponding to the scenario based at least in part on the model of the stack of items generated based on the simulation of the placement of the item. Examples of the characteristics pertaining to the stack of items include (i) an expected stability, (ii) a cost, (iii) a time to perform the placement(s) for the scenario, (iv) an indication of whether a collision is expected to occur if the placement is performed, (v) an indication of whether the robot is expected to be positioned in an awkward or inefficient pose during placement of the item, etc.

In some embodiments, 345 and 350 are combined into a single step in which the system uses a machine learning model to determine the one or more characteristics corresponding to the stack of items in accordance with the scenario, and/or a score based on an analysis using the scoring function.

At 355, the system determines whether modelling placement of more items is to be performed. For example, the system determines whether any items in the set of items (or the set of next N items) remain to be placed according to the scenario. In response to determining that simulation of placement of more items is to be performed, process 300 returns to 330 and process 300 iterates over 330-355 until no further modelling of placement of items are to be performed for the selected scenario. In response to determining that no additional items exist, process 300 proceeds to 360.

At 360, the system determines whether additional scenarios for placement of the set of items exist. For example, the system determines whether other orders or combinations/permutations of stacking the items remain within the search space. In response to determining that additional scenarios exist, process 300 returns to 325 and process 300 iterates over 325-360 until no further scenarios exist. In response to determining that no additional scenarios exist, process 300 proceeds to 365.

At 365, the various scenarios within the search space are compared and a best scenario is determined. The system can determine the best scenario (e.g., the placement of the set of items, or of the next item, which is expected to yield a best result) based at least in part on the one or more characteristics corresponding to the stack of items for the various scenarios. For example, the system determines a placement that yields a highest expected stability. As another example, the system determines a placement that yields a lowest cost according to a predefined cost function. As another example, the system determines the best scenario to be the first placement traversed in the search for which the expected stability satisfies a stability criteria (e.g., a stability greater than a stability threshold, absence of a heuristic that would indicate the stack of items is unstable, etc.) and/or satisfies a cost criteria.

At 370, the picking and placing of the item according to the best scenario is implemented. In some embodiments, the system determines a plan for placing the item based on the placement location and orientation for the scenario.

Figure 4A:
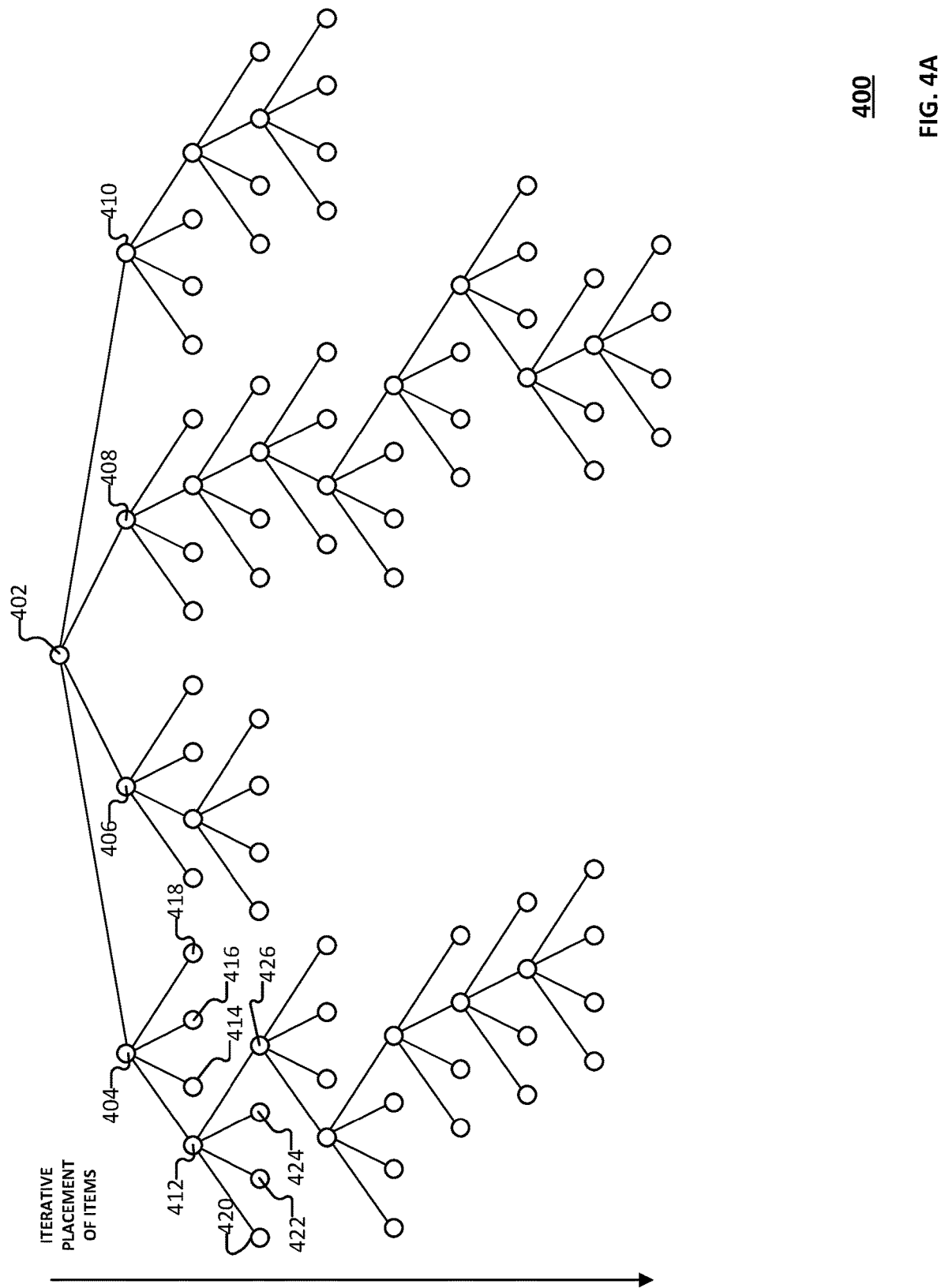
FIG. 4A is a tree corresponding to different states or placements of items according to various embodiments.

FIG. 4A is a tree corresponding to different states or placements of items according to various embodiments. In some embodiments, system 100 of FIG. 1 determines or uses search space 400 in connection with determining a placement of a current item (e.g., a next item from among a set of items to be placed).

In the example illustrated in FIG. 4A, search space 400 is represented in a tree structure. Search space 400 comprises a plurality of nodes, and each node may correspond to a scenario of placement of an item and each branch may correspond to placing a current item at a particular item and in a particular orientation.

Search space 400 comprises root node 402. Root node 402 corresponds to a current state of the pallet/stack of items. For example, the system queries a state estimation service/module to obtain an estimated state, and uses such estimated state as the state at root node 402.

Figure 4B:
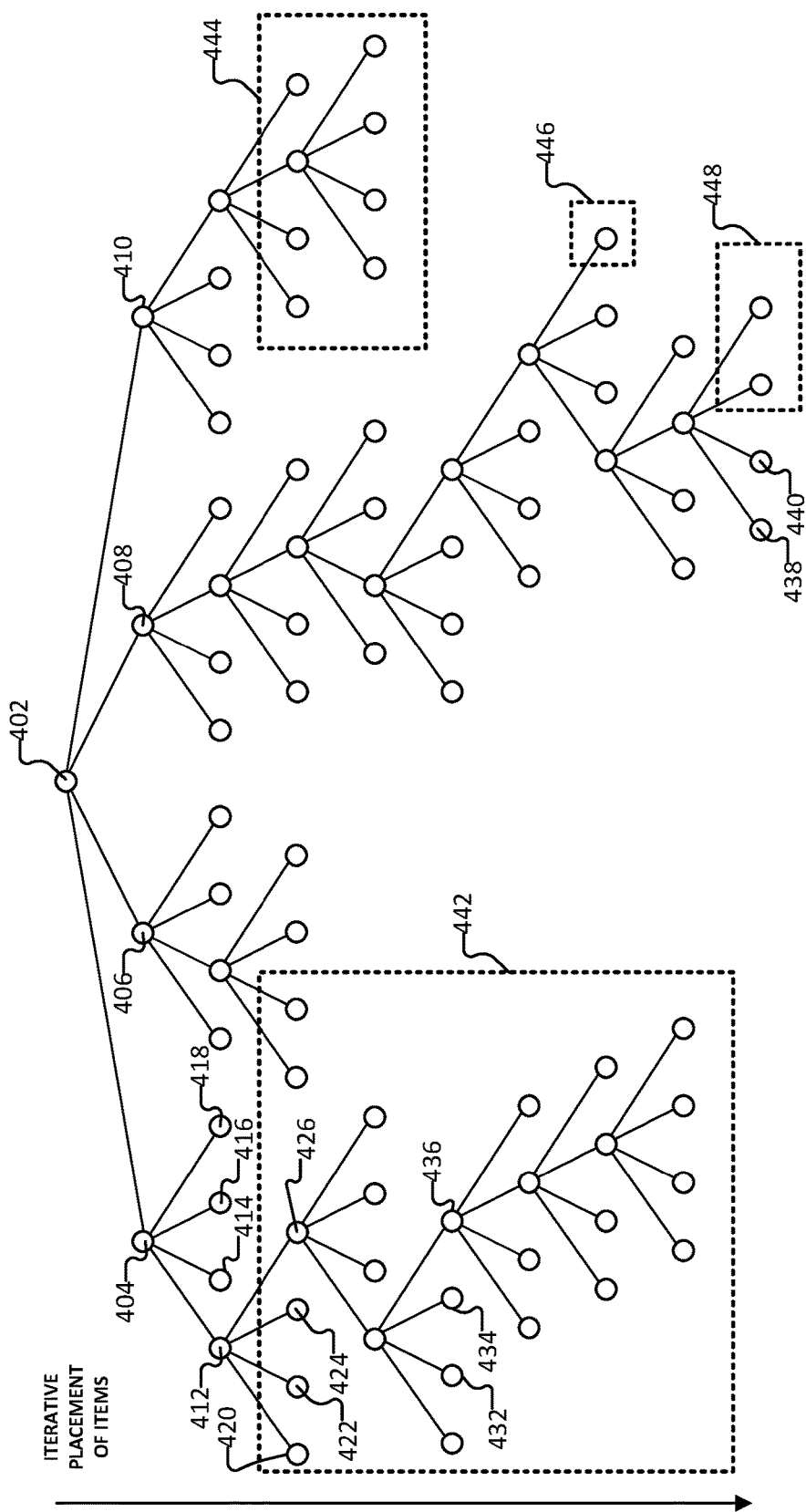
FIG. 4B is a tree corresponding to different states or placements of items according to various embodiments.

In response to determining the root node, the system iteratively determines placements for a set of next items. For example, the system progresses through the different orders of the tree based on placement of different next items. Nodes 404, 406, 408, and 410 corresponds to placement of a first next item (e.g., the item for which the system is determining a best placement). As an example, nodes 404, 406, 408, and 410 are first-order nodes respectively corresponding to different placements of a first next item (e.g., different locations and/or different orientations, or different items in the case that the system is permitted to buffer some items). As illustrated in FIGS. 4A and 4B, each of nodes 404, 406, 408, and 410 have second-order nodes respectively branching therefrom. For example, nodes 412, 414, 416, and 418 branch from node 404. Each of the second-order nodes (e.g., child nodes to nodes 404, 406, 408, and 410) respectively correspond to different placements of a second next item (e.g., different locations and/or different orientations, or different items in the case that the system is permitted to buffer some items). As the system determines placements corresponding to each node, the system determines nodes that branch from the nodes for placements of the remaining items to be modelled. For example, in response to determining the placement for node 412, the system determines the nodes 420, 422, 424, and 426 (e.g., the system determines estimated states and associated information for the nodes).

If the system were to analyze the scoring function or cost function at each node in search space 400, such an analysis may be computationally expensive. Accordingly, as illustrated in FIG. 4B, various embodiments prune search space 400 to limit the number of nodes for which the state/stability is to be determined in connection with determining placement of an item (e.g., the first next item).

FIG. 4B is a tree corresponding to different states or placements of items according to various embodiments. In some embodiments, system 100 of FIG. 1 determines or uses search space 430 in connection with determining a placement of a current item (e.g., a next item from among a set of items to be placed).

The system determines search space 430 based on determining whether to prune and/or a manner by which to prune search space 400. Segmented areas 442, 444, 446, and 448 correspond to areas of the tree that the system has determined to be unfavorable scenarios and thus pruned from search space 400 (e.g., the tree).

In some embodiments, the system determines whether a node corresponds to a favorable or unfavorable scenario based on using a machine learning model to model the current state and the corresponding placement(s). As an example, the system uses the machine learning model in connection with determining a score for the scenario based on a scoring function. As another example, the system uses the machine learning model in connection with determining a cost for the scenario based on a cost function. The system can compare the score/cost to a predefined threshold (e.g., a scoring threshold, a cost threshold, etc.). In some embodiments, in response to determining that the score for a scenario is less than the scoring threshold, the system determines that the scenario is unfavorable or infeasible. In some embodiments, if the system determines that score for the scenario is not less than the scoring threshold, the system determines that the scenario is favorable.

According to various embodiments, in response to modelling the scenario (e.g., the current state and/or corresponding placements) using a machine learning model and/or analyzing the scenario with respect to a scoring function or cost function, the system determines whether to prune the corresponding node(s). If the system determines to prune a node, the system prunes the node and all potential nodes that branch from the node. For example, in response to determining that node 426 is to be pruned (e.g., that the node corresponds to an unfavorable scenario), the system correspondingly determines to prune nodes 432, 434, 436, etc. based on such nodes branching directly or indirectly from node 426. In some embodiments, the system determines to prune nodes 432, 434, 436, etc. without further analysis using one or more heuristics. For example, the system determines to prune nodes 432, 434, 436, etc. based on the determination to prune node 426.

In some embodiments, after determining search space 430 (e.g., after pruning search space 400), the system determines a best placement for the next item (e.g., the item for the first-order nodes). The system can perform a Monte Carlo tree search in connection with determining the best placement among the various scenarios of search space 430. The system can determine the best placement based on the respective scores corresponding to the various scenarios (e.g., using a machine learning model to determine a score based on a scoring function).

In some embodiments, the system determines that the best placement of the next item corresponds to the placement at node 408. For example, the system determines that the placement at node 408 is best based on a determination that the state of the stack of items remains favorable (e.g., cost effective, stable, etc.) through several orders of placements (e.g., the state remains favorable for a placement of the highest number of subsequent items, etc.). In some embodiments, the system determines that nodes 438 and 440 remain favorable through placement of nine different items (e.g., the next item and the M items after the next item, where M is eight in this example). In some embodiments, the system performs a beam search with respect to search space 430 to determine a best placement.

In connection with determining whether to prune a node, the system can implement a pruning criteria. In some embodiments, the pruning criteria includes one or more of (i) the state is expected to have a stability less than a stability threshold, (ii) the state violates a heuristic (e.g., a deformable item being placed at or near the bottom of a stack of items, etc.), (iii) a cost for the corresponding placements is expected to exceed a cost threshold, (iv) a robot is expected to be positioned in an awkward pose, (v) an expected density of the stack of items being less than a predefined density threshold, etc. In some embodiments, the pruning criteria corresponds to a score of a scenario (e.g., using a scoring function) that is less than a scoring threshold. The scoring threshold may be configurable based on a user or system preference (e.g., a quality of service, an acceptable latency in determining the placement for the next item, an acceptable stability or cost, etc.).

Figure 4C:
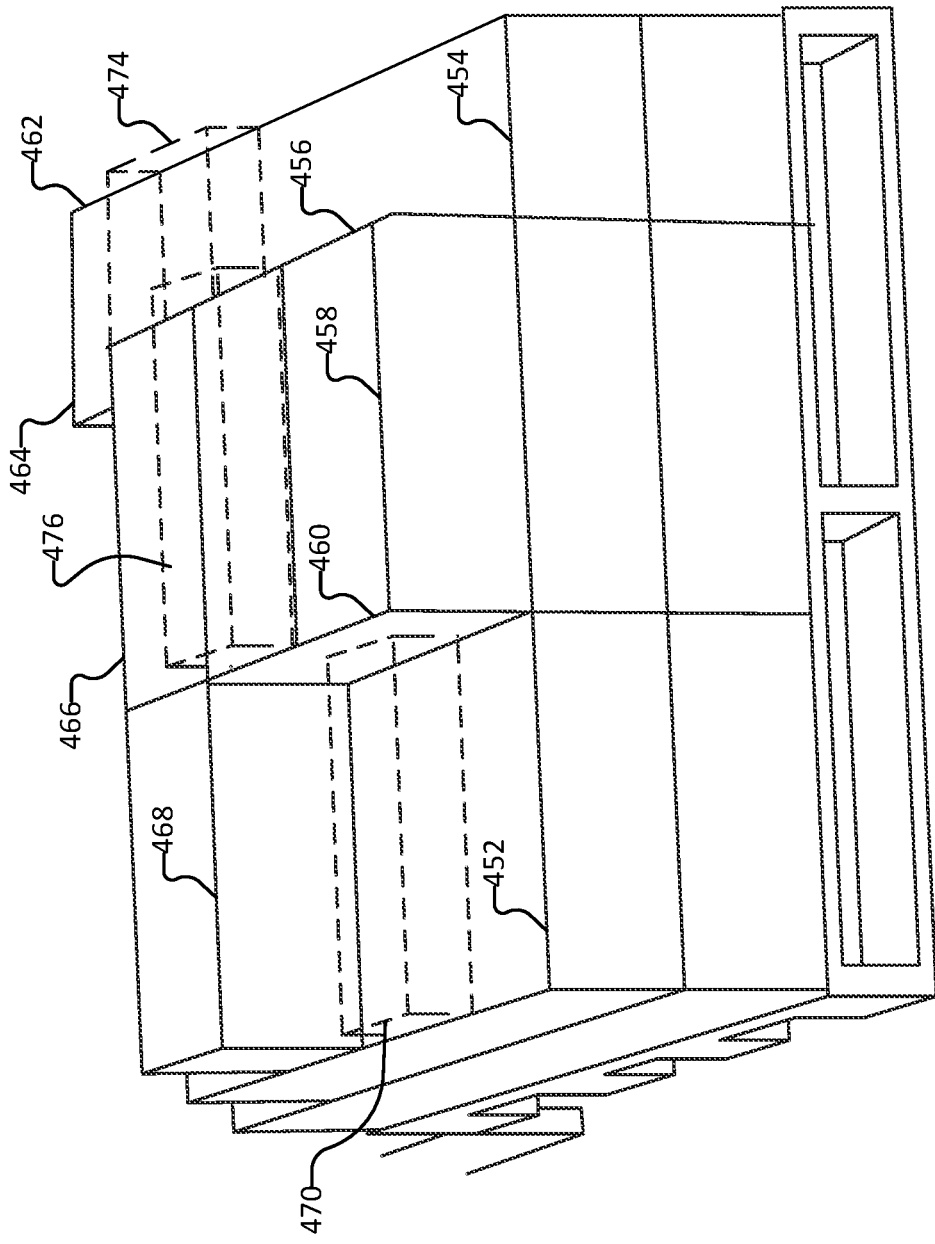
FIG. 4C is a diagram of a stack of items with potential placements according to various embodiments.

FIG. 4C is a diagram of a stack of items with potential placements according to various embodiments. In some embodiments, system 100 of FIG. 1 determines model 450 of the stack of items.

In some embodiments, the system determines model 450 based on a geometric model and/or sensor data. The system can use a machine learning model to obtain model 450.

As illustrated in FIG. 4C, the system uses the current estimated state (e.g., based on the geometric model and/or sensor data) to determine various items in the stack of items and/or edges and vertices defining potential placement locations. For example, the system performs an image processing or machine learning analysis to identify edges such as edges 452, 454, 456, 458, 460, 462, 464, 466, and 468, and/or vertices at which edges meet, etc. In response to identifying one or more of the edges, the system determines potential placements for the current item (e.g., the first next item). The system may also determine potential placements for a set of future items (e.g., a set of N next items, etc.).

In some embodiments, the system can use one or more rules or heuristics in connection with determining placements for the item(s). Examples of the rules or heuristics include (i) a bias/preference for placement of the item at an edge, (ii) a bias/preference for placement of the item next to an item, (iii) a top surface area of a surface on which an item may be placed is greater than a bottom surface of the item to be placed, (iv) a top surface area of a surface area on which an item may be placed is greater than a threshold percentage of a bottom surface area of the item to be placed, (v) a bias/preference to place a large or heavy item at or near a bottom of the stack of items, such as within a threshold distance of the pallet surface, (vi) a bias/preference to place a non-rigid/deformable at or near a top of the stack of items, such as within a threshold distance of a maximum stack height, (vii) an indication that the item fits within the potential location, and (viii) an indication of whether a top surface of an item if placed in a location would be substantially level with an adjacent item, such as within a threshold height of the adjacent item(s), etc. Various other rules/heuristics may be implemented.

As illustrated in FIG. 4C, the system determines that the item (e.g., the current item) can be placed at potential placements 470, 474, and 476. In the example shown, the identified possible placements 470, 474, and 476 are located along edges defined by a top surface (e.g., an exposed surface) of the stack of items.

In some embodiments, in response to determining possible placements 470, 474, and 476, the system uses a machine learning model to evaluate the placements. For example, the system uses a machine learning model to determine a score for a placement based on a scoring function.

Figure 4D:
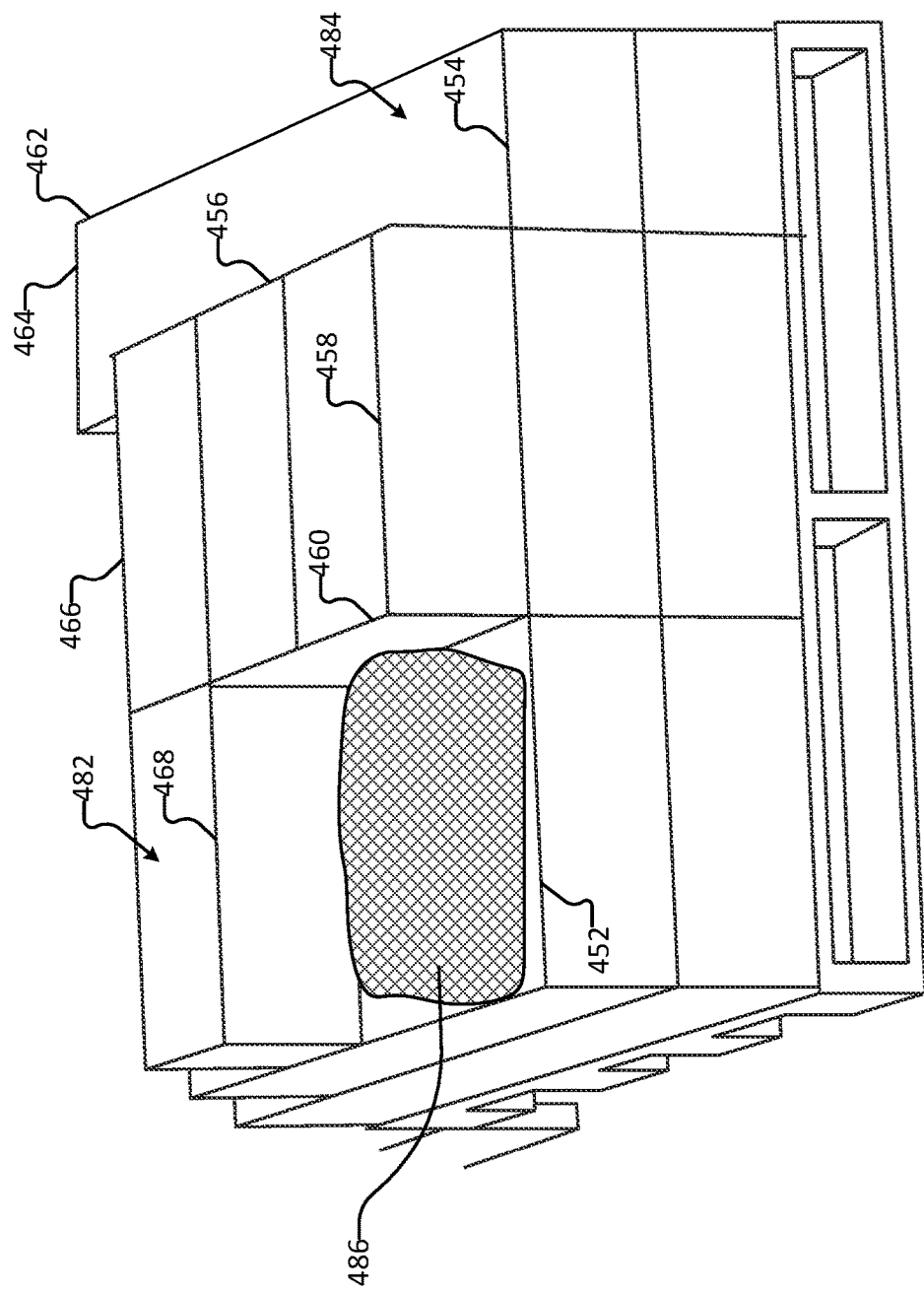
FIG. 4D is a diagram of a stack of items with potential placements according to various embodiments.

FIG. 4D is a diagram of a stack of items with potential placements according to various embodiments. In some embodiments, system 100 of FIG. 1 determines model 480 of the stack of items.

In some embodiments, the system determines model 480 based on a geometric model and/or sensor data. The system can use a machine learning model to obtain model 480. In some embodiments, the system evaluates location 482 and 484 in connection with determining whether such locations are potential placements for item 486. As shown in FIG. 4D, item 486 is an irregularly shaped object. For example, item 486 may be a deformable member and/or have a type of packaging that is non-rigid (e.g., a polybag). Stacking an item on irregularly shaped item 486 may cause instability in the stack of items.

With respect to location 482, the system may determine that such a location is non-feasible at least because the surface is substantially more narrow than a width of item 486 (e.g., a top surface area corresponding to location 482 is less than a threshold percentage of the bottom surface area of item 486). If a top surface of a location is less than a threshold percentage of a bottom surface area of an item to be placed, placement of the item at such a location may lead to instability.

Figure 5:
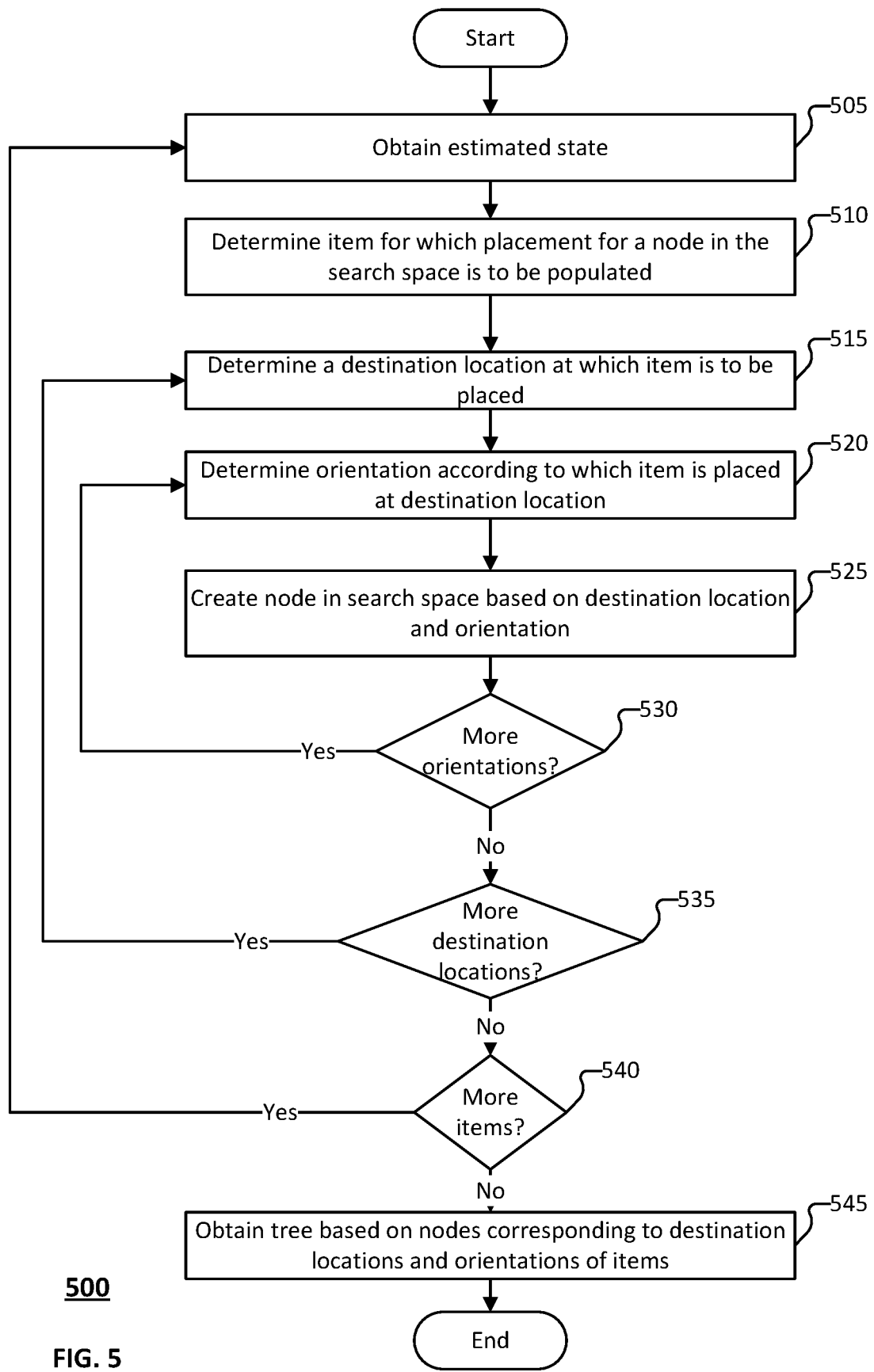
FIG. 5 is a flow chart illustrating a process to determine a tree corresponding to placement of a set of items according to various embodiments.

FIG. 5 is a flow chart illustrating a process to determine a tree corresponding to placement of a set of items according to various embodiments. In some embodiments, process 500 is implemented by system 100 of FIG. 1. In some embodiments, process 500 is invoked in connection with determining a search space for placement of a set of items. For example, process 500 is invoked in response to determining that an item is to be placed on a pallet or stack of items. As an example, the system can determine the search space for each item to be placed (e.g., process 500 is invoked for each item of a set of items to be placed).

At 505, an estimated state is obtained. In some embodiments, the system obtains a current estimated state for the workspace (e.g., the pallet or stack of items). For example, the system can query a state estimation service/module for the estimated state. The estimated state can include a geometric model of the pallet/stack of items.

At 510, an item for which placement corresponding to a node in the search space is to be populated is determined. For example, the system determines a next item that is to be placed. In some embodiments, the next item may correspond to the first next item delivered to the workspace (e.g., by a conveyor). In some embodiments, the next item is selected from a set of items (e.g., set of N items) based on conditions pertaining to item buffering. The conditions pertaining to the item buffering can include (i) a determination of whether buffering is permitted in the system, (ii) a number of items that can be buffered, (iii) a determination of items currently in the buffer, etc. In some embodiments, the item is determined based on a determination of the placement corresponding to the node in the search space (e.g., in the tree structure representing the search space). For example, each node in the search space may correspond to a particular placement (e.g., location and/or orientation) of a particular item.

At 515, a destination location at which the item is to be placed is determined. In response to determining the item to be placed, the system selects a destination location from the set of possible destination locations at which the item can be placed. As an example, the system determines the destination location corresponding to a placement for a particular node in the search space.

At 520, an orientation according to which an item is placed at the destination location is determined. In some embodiments, the system selects an orientation from the set of possible orientations in which the item can be placed at the destination location. As an example, the system determines the orientation corresponding to a placement for the particular node in the search space.

At 525, a node is created in the search space based on the destination location and orientation for the placement of the item. In some embodiments, the system represents the search space in a tree representation, or as a Markov decision process, and the tree is configured to comprise the node corresponding to the destination location and orientation for the placement of the item.

At 530, a determination is made as to whether the item can be placed in additional orientations. The system determines whether additional orientations exist for which a placement is to be included in the search space (e.g., other additional orientations in which the item may be placed at the selected destination location). In response to determining that additional orientations exist at 530, process 500 returns to 520 at which another orientation is selected and process 500 can iterate over 520-530 until no further orientations exist for placement of the item at the destination location. In the case of an item being a rectangularly-shaped or square-shaped box, the item may have 6 corresponding orientations (e.g., an orientation corresponding to placement on each of the sides of the item). In some embodiments, the number of possible orientations may be based on a selected destination location (e.g., based on dimensions of a surface/area for the destination location).

At 535, a determination is made as to whether the item can be placed at additional destination location. The system determines whether additional destination locations exist for which a placement is to be included in the search space. In response to determining that additional destination locations exist at 535, process 500 returns to 515 at which another destination location is selected and process 500 can iterate over 515-535 until no further destination locations exist for placement of the item.

At 540, a determination is made as to whether placement for additional items is to be assessed. In some embodiments, the system determines whether the set of items to be placed comprise items for which a set of placements has not yet been determined. In some embodiments, the system determines placement for a set of N next items, and the system determines whether the set of N next items comprise an item for which a set of placements has not yet been determined. In response to determining that placement for additional items is to be assessed at 540, process 500 returns to 505 at which another item is selected and process 500 can iterate over 505-540 until no further placements for items are to be assessed. In response to determining that placement for no further items is to be assessed at 540, process 500 proceeds to 545.

At 545, the search space is obtained based at least in part on the nodes corresponding to placement of the items. For example, the system determines the search space comprising nodes corresponding to various placements (e.g., destination locations and/or orientations) of a set of items. The system can use the search space in connection with determining placement of a current item.

In some embodiments, in response to determining the search space (e.g., the tree), the system implements a machine learning model in connection with evaluating the various scenarios comprised in the search space (e.g., the scenarios corresponding to the nodes in the tree).

Figure 6:
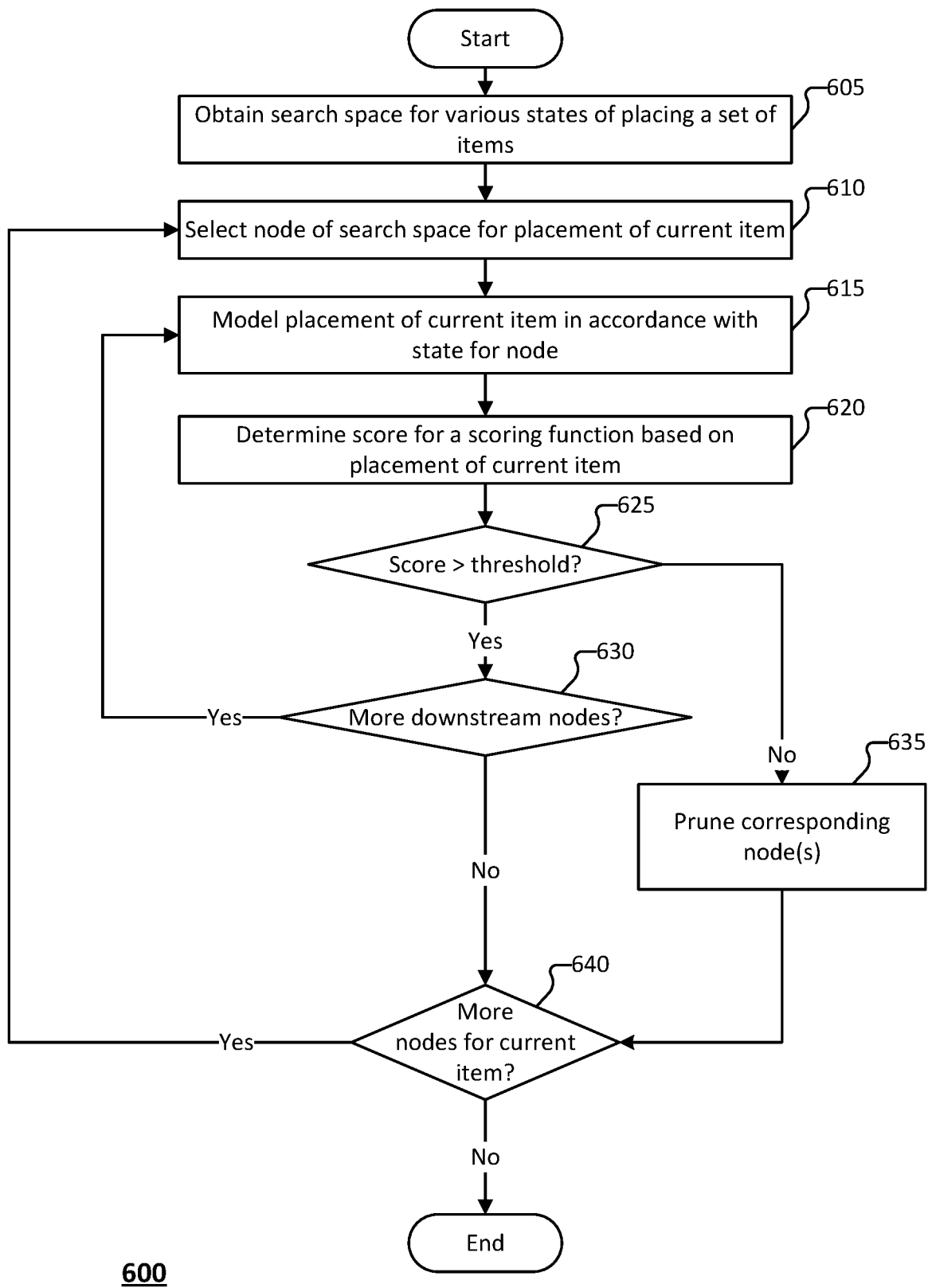
FIG. 6 is a flow chart illustrating a process to prune nodes of a tree for placement of a set of items according to various embodiments.

FIG. 6 is a flow chart illustrating a process to prune nodes of a tree for placement of a set of items according to various embodiments. In some embodiments, process 600 is implemented by system 100 of FIG. 1. In some embodiments, process 600 is invoked in connection with determining a placement and/or plan for placing an item.

At 605, a search space for various states (or scenarios) of placing a set of items is obtained. In some embodiments, the system determines the search space for the various combinations/permutations of placement of a set of items. As an example, the search space is obtained based on invoking process 500 of FIG. 5. In some embodiments, the search space is represented as a tree structure or a Markov decision process.

At 610, a node of the search space for placement of a current item is selected. In some embodiments, the node of the search space corresponds to a placement of a particular item. For example, the node of the search space corresponds to placement of a particular item at a particular location and in a particular orientation. As another example, the node of the search space corresponds to a state of a stack of items in response to placement of a particular item at a particular location and in a particular orientation.

At 615, a model is used to simulate placement of the current item in accordance with a state for the node. The using the model to simulate the placement includes using a machine learning model to evaluate a score or cost for the placement (e.g., a score determined based on a scoring function). In some embodiments, the model is a machine learning model.

In response to determining the placement location and orientation associated with a particular node, the system simulates the placement of the item in accordance with the location and the orientation. The model can be a geometric model that is updated based on the placement of the current item. In some embodiments, the system queries a state estimation service/module for an updated state in view of the placement.

At 620, a score with respect to a scoring function is determined based on a placement of the current item. In some embodiments, the system uses (e.g., queries) a machine learning model to evaluate the placement (e.g., to determine the score according to the scoring function).

At 625, a determination is made as to whether a score for the placement is greater than a scoring threshold. In some embodiments, the system is configured to determine whether a score for the placement is less than a scoring threshold. In response to evaluating placement of the item for the node, the system determines a score with respect to a scoring function and compares the score to a predefined scoring threshold. In response to determining that the score for the placement with respect to the scoring threshold is greater than a predefined scoring threshold at 625, process 600 proceeds to 630. Conversely, in response to determining that the score for the placement with respect to the scoring function is not greater than the predefined threshold at 625, process 600 proceeds to 635.

At 630, a downstream node corresponding a next item to be placed is selected. In some embodiments, the system selects a node that branches from the node selected at 610 (e.g., a child node). In the case that the node selected at 610 is a first-order node (e.g., a node that branches directly from the root node of the tree/search space), the node selected at 630 (at least at the first iteration of 630) can correspond to a second-order node, and at subsequent iterations of 630 can include nodes that branch from the second-order node (e.g., third-order nodes, fourth-order nodes, etc.). In some embodiments, the node selected at 630 corresponds to a placement of an item to be placed after the current item (e.g., the first next item of the set of items to be placed).

At 635, the corresponding node(s) is pruned. In response to determining that the stack of items is not sufficiently stable (e.g., the expected stability is less than a stability threshold, etc.), the system determines to prune the node(s) from the search space. In some embodiments, the pruning the nodes includes pruning the current node (e.g., for the current item selected at 610). In some embodiments, the pruning the nodes includes pruning the current node and nodes that branch from the current node (e.g., downstream nodes such as children nodes, grandchildren nodes, great-grandchildren nodes, etc.). The system prunes the corresponding node(s) to remove such node(s) as potential placements for the set of items.

At 640, a determination is made as to whether additional nodes exist. For example, the system determines whether the search space comprises nodes (e.g., that have not been pruned) for which placement is to be evaluated using the machine learning model. In response to determining that additional nodes exist at 640, process 600 returns to 610 at which process 600 iterates over 610-640 until no further downstream nodes exist. In response to determining that no additional nodes exist, process 600 may end.

In some embodiments, in response to determining that no additional nodes exist, the system may determine a best placement. For example, the system determines a node within the search space that has a highest score with respect to the scoring function. The system may implement a Monte Carlo tree search to identify the best placement.

Figure 7:
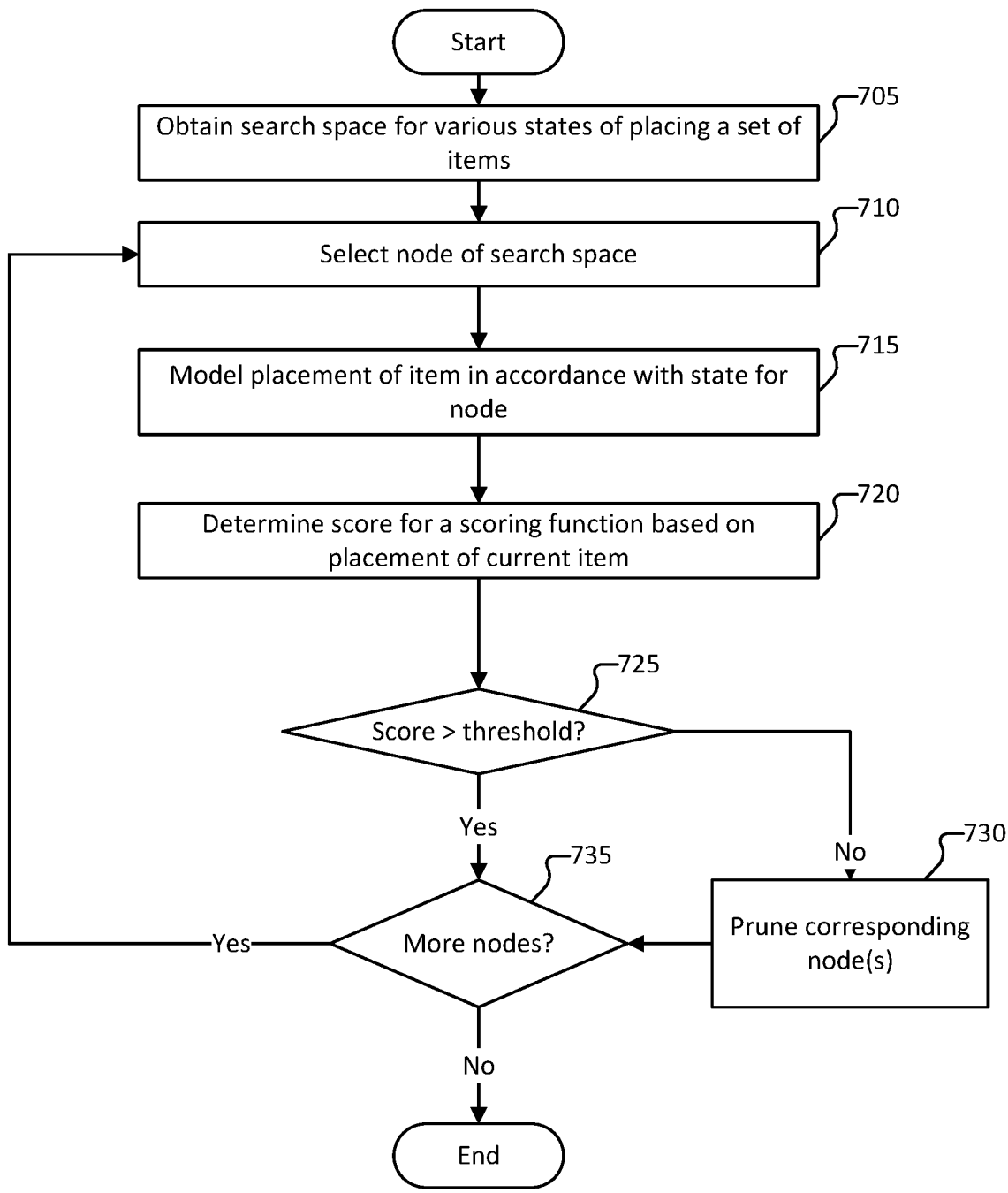
FIG. 7 is a flow chart illustrating a process to prune nodes of a tree for placement of a set of items according to various embodiments.

FIG. 7 is a flow chart illustrating a process to prune nodes of a tree for placement of a set of items according to various embodiments. In some embodiments, process 700 is implemented by system 100 of FIG. 1. In some embodiments, process 700 is invoked in connection with determining a placement and/or plan for placing an item.

At 705, a search space for various states of placing a set of items is obtained. In some embodiments, the system determines the set of items and determines the search space for placement of the set of items. For example, the system determines the various combinations/permutations for placement of the set of items (or a subset of N next items in the set of items to be placed).

At 710, a node of the search space is selected. In some embodiments, the search space is represented as a tree, and the system sequentially selects the nodes branching from a root node (e.g., first order nodes), and the nodes respectively branching directly or indirectly from the first order nodes. In some embodiments, the node of the search space corresponds to a placement of a particular item. For example, the node of the search space corresponds to placement of a particular item at a particular location and in a particular orientation. As another example, the node of the search space corresponds to a state of a stack of items in response to placement of a particular item at a particular location and in a particular orientation.

At 715, a model is used to simulate placement of the current item in accordance with a state for the node. The using the model to simulate the placement includes using a machine learning model to evaluate a score or cost for the placement (e.g., a score determined based on a scoring function). In some embodiments, the model is a machine learning model.

In response to determining the placement location and orientation associated with a particular node, the system simulates the placement of the item in accordance with the location and the orientation. The model can be a geometric model that is updated based on the placement of the current item. In some embodiments, the system queries a state estimation service/module for an updated state in view of the placement.

At 720, a score with respect to a scoring function is determined based on a placement of the current item. In some embodiments, the system uses (e.g., queries) a machine learning model to evaluate the placement (e.g., to determine the score according to the scoring function).

At 725, a determination is made as to whether a score for the placement is greater than a scoring threshold. In some embodiments, the system is configured to determine whether a score for the placement is less than a scoring threshold. In response to evaluating placement of the item for the node, the system determines a score with respect to a scoring function and compares the score to a predefined scoring threshold. In response to determining that the score for the placement with respect to the scoring threshold is greater than a predefined scoring threshold at 725, process 700 proceeds to 735. Conversely, in response to determining that the score for the placement with respect to the scoring function is not greater than the predefined threshold at 725, process 700 proceeds to 730.

At 730, the corresponding node(s) is pruned. In response to determining that the stack of items is not sufficiently stable (e.g., the expected stability is less than a stability threshold, etc.), the system determines to prune the node(s) from the search space. In some embodiments, the pruning the nodes includes pruning the current node (e.g., for the current item corresponding to the node selected at 610). In some embodiments, the pruning the nodes includes pruning the current node and nodes that branch from the current node (e.g., downstream nodes such as children nodes, grandchildren nodes, great-grandchildren nodes, etc.). The system prunes the corresponding node(s) to remove such node(s) as potential placements for the set of items.

At 735, a determination is made as to whether additional nodes exist within the search space for which stability is to be determined/analyzed. In response to determining that additional nodes exist, process 700 returns to 710 and process 700 can iterate over 710-735 until the system evaluates the score with respect to the scoring function for all nodes (all remaining nodes, such as nodes that have not been pruned).

In some embodiments, in response to determining that no additional nodes exist at 735, the system can evaluate the search space to determine a placement that yields a best or optimal result (e.g., a best placement). For example, the system analyzes the nodes remaining in the search space (e.g., nodes that have not been pruned) to select the best placement. In response to determining the best placement, the system can determine a plan for placing the current item in accordance with the best placement, and the system can further control a robot to pick and place the item in accordance with the plan.

Figure 8:
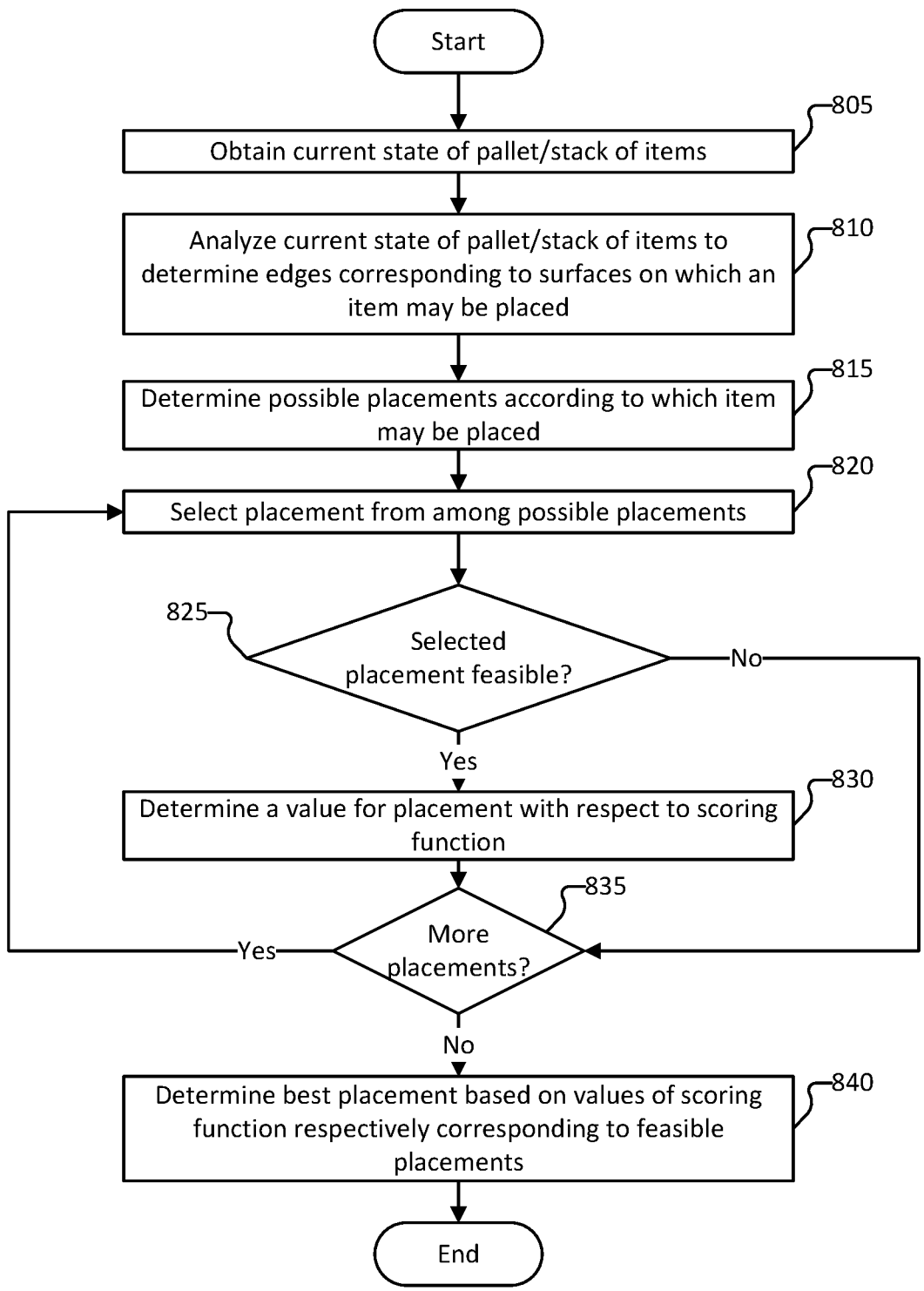
FIG. 8 is a flow chart illustrating a process to select an item placement according to various embodiments.

FIG. 8 is a flow chart illustrating a process to select an item placement according to various embodiments. In some embodiments, process 800 is implemented by system 100 of FIG. 1.

At 805, a current state of the pallet or stack of items is obtained. In some embodiments, the system obtains (e.g., determines) the estimated state. For example, the system can query a state estimation service/module for the estimated state (e.g., a geometric model for the current state of the stack of items).

At 810, the current state of the pallet or stack of items is analyzed to determine edges corresponding to surface on which an item may be placed. In some embodiments, the system analyzes/determines a topography of the top surface of the stack of items. In some embodiments, the system determines one or more characteristics pertaining to a top surface of the stack of items (e.g., surface areas of different levels on the top surface, etc.).

At 815, possible placements according to which the item may be placed is determined. Determining the possible placements according which the item may be placed include determining the various combinations/permutations of locations and orientations in which the item may be placed on the stack of items.

At 820, a placement from among the possible placements is selected.

At 825, a determination is made as to whether the placement is feasible. In some embodiments, the system uses one or more rules or heuristics to determine placements, including destination locations at which a current item fits in a particular orientation. Determining the whether the selected placement is feasible includes determining whether the placement is an acceptable location/orientation based on the rules or heuristics. In some embodiments, determining whether the placement is feasible is based on evaluating the placement using a machine learning model.

In response to determining that the selected placement feasible at 825, process 800 proceeds to 830 at which the value of a scoring function is associated with placing the item according to the placement (e.g., placing the item at the corresponding location and orientation, etc.). In some embodiments, 830 is performed in connection with 825.

In some embodiments, the system determines whether the selected placement is feasible based on using the machine learning model to determine (e.g., compute) an expected stability of the stack of items if the item is placed according to the placement, and the system determines whether the expected stability satisfies a stability criteria (e.g., whether the expected stability is greater than a stability threshold).

In some embodiments, the system determines whether the selected placement is feasible based on using the machine learning model to evaluate a cost for the placement with respect to a cost function, and the system determines whether the cost satisfies a cost criteria (e.g., whether the cost is less than a cost threshold).

At 830, a value for the placement with respect to a scoring function is determined. In some embodiments, the system uses the machine learning model to evaluate a score for the placement with respect to a scoring function. The system can further determine whether the score satisfies a scoring criteria (e.g., whether the score is greater than a scoring threshold).

In some embodiments, the system skips determining the value for placements that are deemed to be infeasible. For example, the system prunes placements that are deemed infeasible and saves on the computational resources that would have been expended to compute the value for such placements.

At 835, a determination is made as to whether additional placements to be evaluated exist. In response to determining that additional placements exist at 835, process 800 returns to 820 at which process 800 iterates over 820-835 until no further placements. In response to determining that no placements exist, process 800 proceeds to 840.

At 840, a best placement is determined based on values with respect to a scoring function for placements deemed to be feasible.

Figure 9:
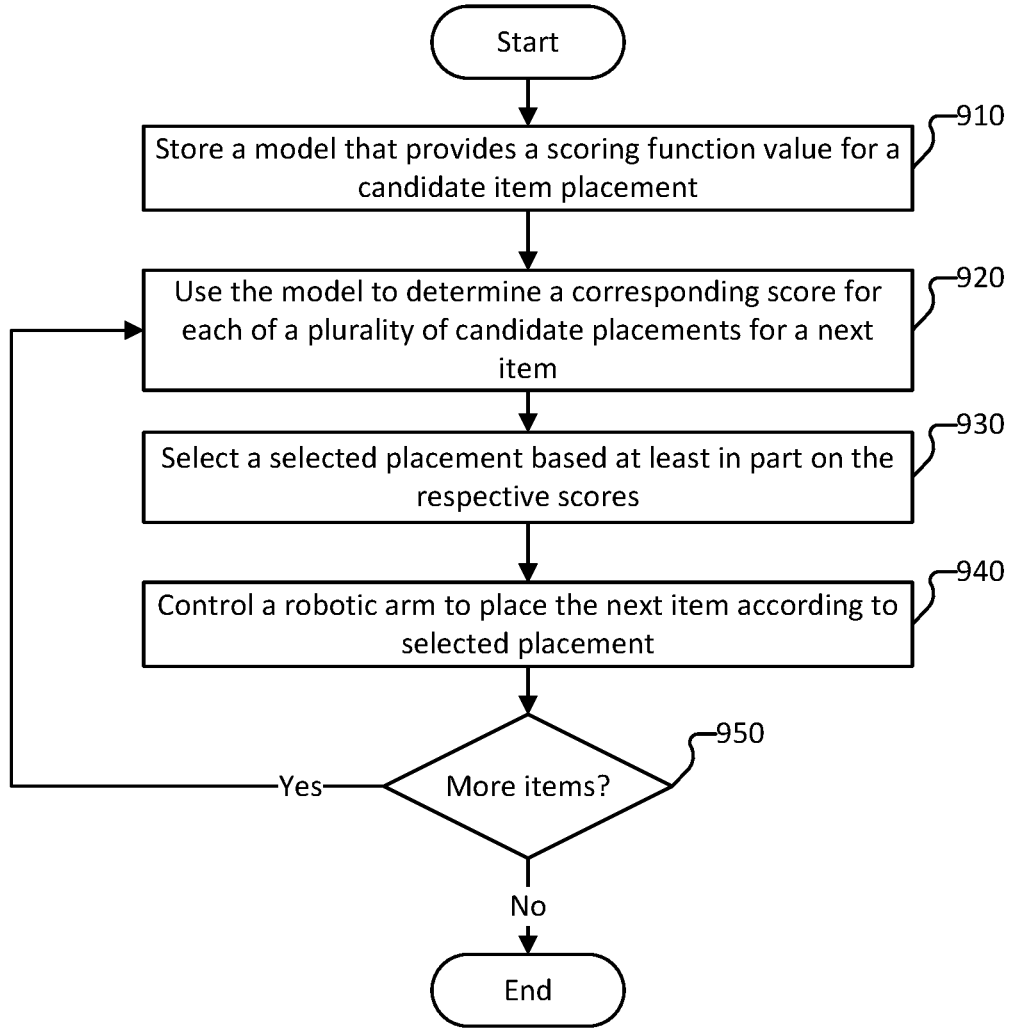
FIG. 9 is a flow chart illustrating a process to select an item placement according to various embodiments.

FIG. 9 is a flow chart illustrating a process to select an item placement according to various embodiments. In some embodiments, process 900 is implemented by system 100 of FIG. 1.

At 910, a model that provides a scoring function value for a candidate item placement is stored. As an example, the model is a machine learning model that evaluates a placement to determine a score with respect to a scoring function.

At 920, the model is used to determining a corresponding score for each of a plurality of candidate placements for a next item.

At 930, a selected placement is selected based at least in part on the respective scores. In some embodiments, the system determines a best placement among the plurality of candidate placements, and uses the best placement to determine a plan for picking and placing the item. The best placement may be the placement having a highest score with respect to the scoring function from among the scores for the plurality of candidate placements.

At 940, a robotic arm is controlled to place the next item according to the selected placement.

At 950, a determination is made as to whether more items are to be placed. For example, the system determines whether the stack of items is complete (e.g., no more items exist within the set of items to be palletized), etc. In response to determining that more items are to be placed at 950, process 900 returns to 920 and process 900 iterates over 920-950 until no further items exist. In response to determining that no more items exist at 950, process 900 may end.

Figure 10:
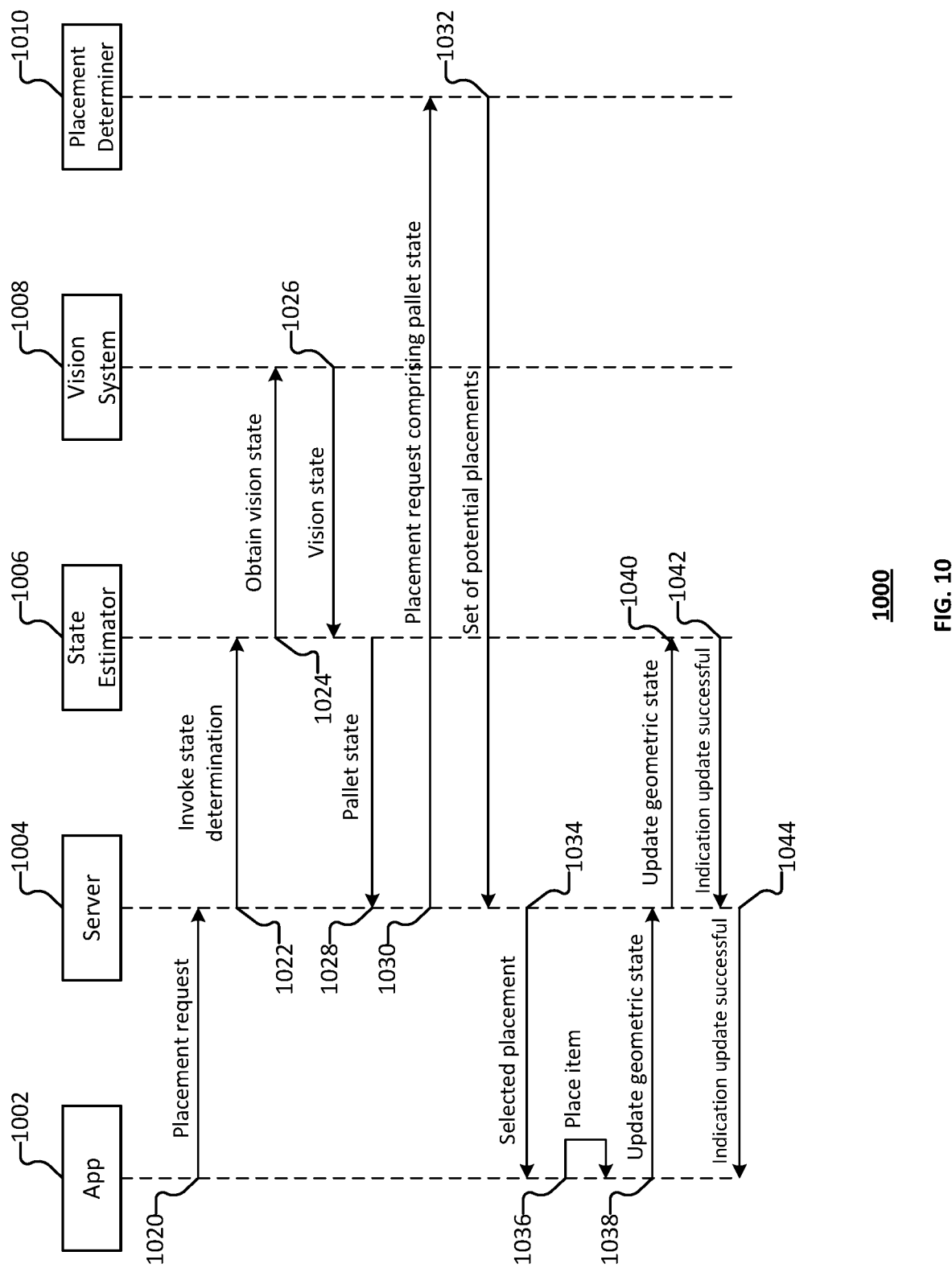
FIG. 10 is a flow diagram illustrating an embodiment of determining an estimate of a state of a pallet and/or stack of items.

FIG. 10 is a flow diagram illustrating an embodiment of determining an estimate of a state of a pallet and/or stack of items. In some embodiments, process 1000 is implemented at least in part by system 100 of FIG. 1.

In some embodiments, process 1000 is implemented by one or more of an app 1002 running on a control system for a robotic arm, server 1004, state estimator 1006, vision system 1008, and placement determiner 1010.

At 1020, app 1002 sends a request to server 1004. The request can correspond to a placement request for a plan and/or strategy for placing an item.

In response to receiving the placement request, at 1022, server 1004 invokes a state determination. For example, server 1004 sends a request or instruction to state estimator 1006 to determine (and provide) the estimated state. In some embodiments, state estimator 1006 is a module running on server 1004. In some embodiments, state estimator 1006 is a service that is queried by a plurality of different servers/robotic systems. For example, state estimator 1006 may be a cloud service.

In response to invoking the state determination, state estimator 1006 obtains the vision state. In some embodiments, state estimator 1006 sends to vision system 1008 a request for a vision state.

In response to receiving the request for the vision state at 1024, at 1026, vision system 1008 provides the vision state to state estimator 1006. For example, in response to receiving the request for the vision state, the vision system users one or more sensors in a workspace to capture a snapshot of the workspace.

In response to receiving the vision state, state estimator 1006 determines the pallet state (e.g., an estimated state of the pallet and/or stack of items). State estimator 1006 may determine the estimated state based on one or more of a geometric model and the vision state. In some embodiments, state estimator 1006 combines the geometric model and the vision state (at least with respect to a part of the stack).

At 1028, state estimator 1006 provides the pallet state to server 1004.

At 1030, server 1004 sends a placement request comprising the pallet state to placement determiner 1010. In some embodiments, placement determiner 1010 is a module running on server 1004. In some embodiments, placement determiner 1010 is a service that is queried by a plurality of different servers/robotic systems. For example, placement determiner 1010 may be a cloud service.

At 1032, placement determiner 1010 provides a set of one or more potential placements to server 1004. The set of one or more potential placements may be determined based at least in part on an item(s) to be placed (e.g., attributes associated with the item) and the pallet state (e.g., available locations and attributes of items within the stack of items), etc.

In some embodiments, the set of one or more potential placements is a subset of all possible placements. For example, placement determiner 1010 uses a cost function to determine the set of one or more potential placements to provide to server 1004. Placement determiner 1010 may determine potential placements that satisfy a cost criteria (e.g., have a cost less than a cost threshold) with respect to the cost function.

In response to receiving the set of one or more potential placements, at 1034, server 1004 selects a placement and sends the selected placement to app 1002. For example, the selected placement is provided as a response to the initial placement request at 1020.

At 1036, app 1002 controls a robotic arm to place the item. In some embodiments, app 1002 determines a plan to move the item to the selected placement (e.g., based on an attribute(s) of the item and the location corresponding to the selected placement, such as coordinates in the workspace).

At 1038, app 1002 provides an indication to server 1004 to perform an update with respect to the geometric state. For example, app 1002 provides confirmation that the placement of the item was performed at 1036 and server 1004 deems such confirmation to be an indication that an update to the geometric state (e.g., geometric model) is to be invoked.

At 1040, server 1004 sends to state estimator 1006 a request to update the geometric state. For example, server 1004 requests that state estimator 1006 update the geometric model to reflect placement of the item in accordance with the corresponding plan.

In response to receiving the request to update the geometric state, state estimator 1006 performs the corresponding update. At 1042, state estimator 1006 provides an indication to server 1004 that the geometric state was successfully updated.

At 1044, server 1004 provides to app 1002 an indication that the geometric state was successfully updated to reflect placement of the item.

Process 1000 may be repeated for a set of items to be stacked.

Although the foregoing examples are described in the context of palletizing or de-palletizing a set of items, various embodiments may be implemented in connection with singulating a set of items and/or kitting a set of items. For example, various embodiments are implemented to determine/estimate a state of the workspace (e.g., chute, conveyor, receptacle, etc.) based at least in part on geometric data and sensor data (e.g., a combination of the geometric data and sensor data, such as an interpolation between the geometric data and sensor data).

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A robotic system, comprising:
a memory configured to store a machine learning-based model to provide a scoring function value for a candidate item placement on a pallet on which are plurality of items are to be stacked given a current state value of the pallet and a set of zero or more items placed previously; and
one or more processors coupled to the memory and configured to:
use the model to determine a corresponding score for each of a plurality of candidate placements for a next item to be placed and the current state value associated with the current state of the pallet and a set of zero or more items placed previously,
wherein:
a search space of possible scenarios for placing the candidate item and zero or more of the plurality of items is pruned based at least in part on a determination that a score for a particular candidate placement of the plurality of placement is less than a predefined scoring threshold; and
the pruning of the search for the particular candidate placement includes removing from the particular candidate placement as a potential placement, and a set of placements that depend on the pruned candidate placement;
select a selected placement based at least in part on the respective scores; and
control a robotic arm to place the next item according to the selected placement.

2. The robotic system of claim 1, wherein an item placement comprises a placement of the item in a particular location.

3. The robotic system of claim 1, wherein the one or more processors are further configured to train the machine learning-based model.

4. The robotic system of claim 1, wherein the machine learning-based model is trained by observing a set of physical palletization processes.

5. The robotic system of claim 1, wherein the machine learning-based model is trained based on a set of predefined heuristics.

6. The robotic system of claim 5, wherein the set of predefined heuristics comprise one or more of (i) a bias or preference to place an item at an edge, (ii) a bias or preference to place an item up against another item among a stack of items, (iii) a bias or preference to place a large or heavy item at or near a bottom of the stack of items, (iv) a bias or preference to place a small or light item at or near a top of the stack of items, (v) a bias or preference to place an irregularly shaped item at or near the top of the stack of items, (vi) a bias or preference to place a deformable item at or near the top of the stack of items.

7. The robotic system of claim 1, wherein the plurality of candidate placements is limited to a predefined number of placements.

8. The robotic system of claim 1, wherein the plurality of candidate placements is limited to a set of placements that satisfy a criteria for possible placements.

9. The robotic system of claim 8, wherein the criteria for possible placements is a predefined scoring threshold according to a predefined scoring function.

10. The robotic system of claim 1, wherein the selecting the selected placement is based at least in part on performing a tree search of various scenarios.

11. The robotic system of claim 10, wherein the various scenarios respectively correspond to different combinations of (i) sequences of item placements, (ii) locations at which respective items are placed, and (iii) orientations in which the respective items are placed.

12. The robotic system of claim 1, wherein the pruning the search space comprises pruning branches or nodes for scenarios that have respective scores for a scoring function that is less than a predefined scoring threshold.

13. The robotic system of claim 12, wherein the pruning the branches or nodes for scenarios comprises:
use the scoring function to determine a score for a scenario corresponding to a first node;
determining whether the score corresponding to the first node is less than the predefined scoring threshold; and
in response to determining that the score corresponding to the first node is less than the predefined scoring threshold,
pruning the first node from the search space.

14. The robotic system of claim 13, wherein the pruning the branches or nodes for the scenarios further comprises:
in response to determining that the score corresponding to the first node is less than the predefined scoring threshold,
determining whether the search space has one or more downstream nodes that branch directly or indirectly from the first node; and
in response to determining that the search space has one or more downstream nodes that branch directly or indirectly from the first node,
pruning the one or more downstream nodes.

15. The robotic system of claim 14, wherein the one or more downstream nodes are pruned without computing respective scores according to the predefined scoring function for the scenarios corresponding to the one or more downstream nodes.

16. The robotic system of claim 1, wherein the pruning the search space comprises pruning branches or nodes for scenarios that have respective costs for a cost function that is more than a predefined cost threshold.

17. The robotic system of claim 1, wherein the current state reflects one or more of (i) a stability of the pallet or stack of items on the pallet, (ii) a packing density of items placed on the pallet, (iii) an efficient use of resources, (iv) a collision avoidance, and (vi) avoidance of awkward positioning of the robotic arm.

18. The robotic system of claim 1, wherein the respective scores reflect how the corresponding candidate placement would contribute to a current or future value of the state of the pallet or a stack of items placed on the pallet.

19. A method to control a robot, comprising:
storing a machine learning-based model to provide a scoring function value for a candidate item placement on a pallet on which are plurality of items are to be stacked given a current state value of the pallet and a set of zero or more items placed previously;
using the model to determine a corresponding score for each of a plurality of candidate placements for a next item to be placed and the current state value associated with the current state of the pallet and a set of zero or more items placed previously, wherein:
a search space of possible scenarios for placing the candidate item and zero or more of the plurality of items is pruned based at least in part on a determination that a score for a particular candidate placement of the plurality of placement is less than a predefined scoring threshold; and
the pruning of the search for the particular candidate placement includes removing from the particular candidate placement as a potential placement, and a set of placements that depend on the pruned candidate placement;
selecting a selected placement based at least in part on the respective scores; and
controlling a robotic arm to place the next item according to the selected placement.

20. A computer program product to control a robot, the computer program product being embodied in a non-transitory computer readable medium and comprising computer instructions for:
storing a machine learning-based model to provide a scoring function value for a candidate item placement on a pallet on which are plurality of items are to be stacked given a current state value of the pallet and a set of zero or more items placed previously;
using the model to determine a corresponding score for each of a plurality of candidate placements for a next item to be placed and the current state value associated with the current state of the pallet and a set of zero or more items placed previously, wherein:
a search space of possible scenarios for placing the candidate item and zero or more of the plurality of items is pruned based at least in part on a determination that a score for a particular candidate placement of the plurality of placement is less than a predefined scoring threshold; and
the pruning of the search for the particular candidate placement includes removing from the particular candidate placement as a potential placement, and a set of placements that depend on the pruned candidate placement;
selecting a selected placement based at least in part on the respective scores; and
controlling a robotic arm to place the next item according to the selected placement.

* * * * *